US012776085B2

(12) United States Patent
Fedorov et al.

(10) Patent No.: US 12,776,085 B2
(45) Date of Patent: Oct. 27, 2026

(54) DETERMINING EMOTION STATES FOR SPEECH

(71) Applicant: NVIDIA Corporation, Santa Clara, CA (US)

(72) Inventors: Ilia Fedorov, Yerevan (AM); Dmitry Korobchenko, London (GB)

(73) Assignee: NVIDIA Corporation, Santa Clara, CA (US)

( * ) Notice: Subject to any disclaimer, the term of this patent is extended or adjusted under 35 U.S.C. 154(b) by 156 days.

(21) Appl. No.: 18/587,004

(22) Filed: Feb. 26, 2024

(65) Prior Publication Data

US 2025/0272901 A1 Aug. 28, 2025

(51) Int. Cl.

| | |
|---|---|
| ***G06T 13/20*** | (2011.01) |
| ***G06N 7/01*** | (2023.01) |
| ***G06T 13/40*** | (2011.01) |
| ***G10L 15/06*** | (2013.01) |
| ***G10L 25/57*** | (2013.01) |
| ***G10L 25/63*** | (2013.01) |

(52) U.S. Cl.

CPC ............. *G06T 13/205* (2013.01); *G06N 7/01* (2023.01); *G06T 13/40* (2013.01); *G10L 15/063* (2013.01); *G10L 25/57* (2013.01); *G10L 25/63* (2013.01); *G10L 2015/0635* (2013.01)

(58) Field of Classification Search

None

See application file for complete search history.

(56) References Cited

U.S. PATENT DOCUMENTS

| | | | | |
|---|---|---|---|---|
| 11,605,538 | B2 | 3/2023 | Zi et al. | |
| 2010/0003969 | A1* | 1/2010 | Isobe | H04M 3/533 455/412.1 |
| 2020/0250278 | A1* | 8/2020 | Liu | G06F 40/30 |
| 2020/0364303 | A1 | 11/2020 | Liu et al. | |
| 2021/0034705 | A1* | 2/2021 | Chhaya | G06N 3/044 |
| 2022/0036916 | A1* | 2/2022 | Zhang | G10L 25/63 |
| 2022/0207262 | A1* | 6/2022 | Jeong | G06V 40/172 |
| 2022/0292125 | A1* | 9/2022 | Mathur | G06V 20/40 |
| 2022/0374637 | A1* | 11/2022 | Liu | G10L 15/16 |
| 2024/0212705 | A1* | 6/2024 | Wang | G10L 15/26 |
| 2025/0061917 | A1* | 2/2025 | Belanich | G10L 25/63 |

* cited by examiner

*Primary Examiner* — Joni Hsu

(74) *Attorney, Agent, or Firm* — IRON SUMMIT IP LLP

(57) ABSTRACT

In various examples, determining emotional states for speech in conversational artificial intelligence (AI) and/or digital avatar systems and applications is descried herein. Systems and methods are disclosed that use one or more machine learning models to determine one or more emotional states associated with speech, where the machine learning model(s) may be trained using various processes. For instance, in some examples, the machine learning model(s) may be trained during a first training process to determine probabilities for distributions of values, where the distributions model different emotional states. For example, a distribution may include a first value for angry, a second value for happy, a third value for sad, and/or so forth. Additionally, or alternatively, in some examples, the machine learning model(s) may be trained during a second training process to more precisely determine the actual emotional states (and/or the probabilities) based on training data representing human feedback.

20 Claims, 12 Drawing Sheets

DETERMINING EMOTION STATES FOR SPEECH

BACKGROUND

Many applications, such as gaming applications, interactive applications, communications applications, multimedia applications, and/or the like, use animated characters, digital avatars, non-player characters (NPCs), digital humans, and/or the like to interact with users of the applications and/or other animated characters within the applications. In order to provide more realistic experiences for the users, some animated characters interact using both audio, such as speech, as well as visual indicators. For example, when an animated character is interacting with a user, an application may both sync the lip movements of the animated character with speech being output by the animated character while also causing the animated character to visually express emotions through facial movement, gestures, and/or the like. Visually expressing facial emotions may include causing the animated character to move various features of the face, such as the eyes, the mouth, the eyebrows, the nose, the cheeks, and/or other features of the face.

As such, various techniques have been developed to determine emotions associated with speech that is output by animated characters. For example, a conventional system may process audio data representing user speech using a machine learning model. The machine learning model may then determine, based at least on the processing, an emotional state associated with the speech. However, based on a length of the speech, a context of the speech, and/or other factors associated with the speech, the speech may actually be associated with multiple emotional states. For example, a user that outputs the speech may be happy during a first part of the speech and angry during a second part of the speech. As such, by determining only a single emotional state for the speech, the output from the machine learning model may not be adequate enough for animating a character in a way that accurately expresses these changes in emotion throughout the speech, leading to less realistic or believable character or avatar animations.

SUMMARY

Embodiments of the present disclosure relate to determining emotional states for speech in conversational artificial intelligence (AI) and/or digital avatar systems and applications. Systems and methods are disclosed that use one or more machine learning models to determine one or more emotional states associated with speech—which may include two or more emotional states at a given instance or frame—where the machine learning model(s) may be trained using various processes. For instance, in some examples, the machine learning model(s) may be trained during a first training process to determine probabilities for distributions of values, where the distributions model different emotional states. For example, a distribution may include values for different emotional states, such as a first value (e.g., a first coefficient) for angry, a second value (e.g., a second coefficient) for happy, a third value (e.g., a third coefficient) for sad, and/or so forth. Additionally, or alternatively, in some examples, the machine learning model(s) may be trained during a second training process to more precisely determine the actual emotional states (and/or the probabilities) based on training data representing human feedback. For instance, the training data may indicate which emotional states (and/or sequences or combinations of emotional states) better relate to speech, where the machine learning model(s) is then trained to generate outputs associated with those emotional states.

In contrast to conventional systems, the systems of the current disclosure, in some embodiments, are able to use the machine learning model(s) to determine probabilities for distributions of values that model emotional states. As described herein, the distributions of emotional states may more accurately represent the speech as compared to determining marginal emotional states, such as a single emotional state, as performed by the conventional systems. Additionally, the machine learning model(s) is able to determine a sequence and combination of emotional states associated with speech rather than just a single emotional state. As described herein, by determining the sequence of emotional states, the emotional states determined by the machine learning model(s) may better represent actual emotions associated with the speech as compared to the single emotional state. For instance, in some examples, the sequence of emotional states may better represent the speech since actual humans change emotional states while speaking, or speak with some level of two or more emotions at once, such as by expressing different emotions for different parts of the speech. As such, an animated character that is outputting speech should also change emotional states while outputting the speech rather than just maintaining a single emotional state.

BRIEF DESCRIPTION OF THE DRAWINGS

The present systems and methods for determining emotion for speech in conversational AI and/or digital avatar systems and applications are described in detail below with reference to the attached drawing figures, wherein.

DETAILED DESCRIPTION

Figure 1:
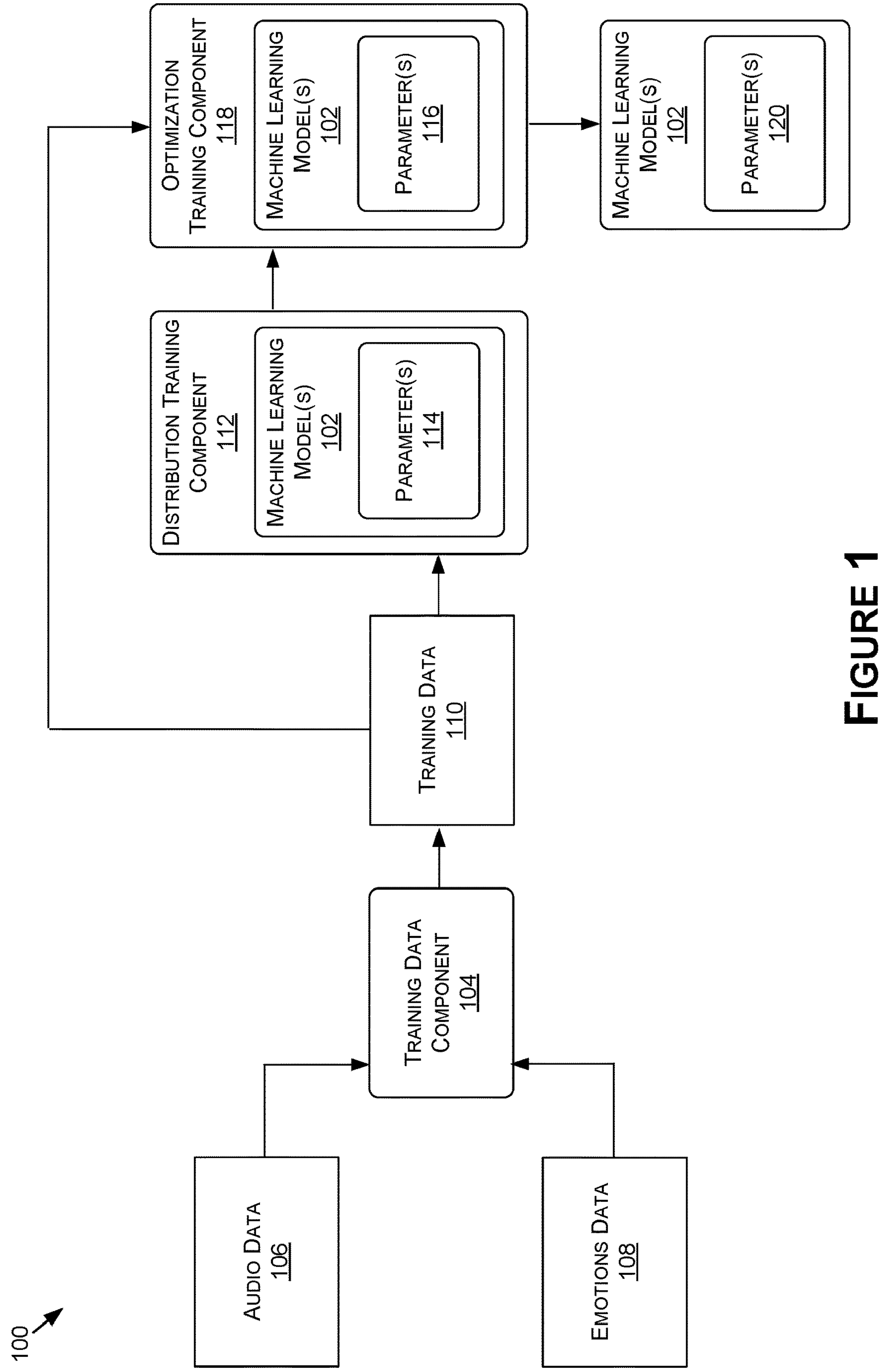
FIG. 1 illustrates an example data flow diagram for a process of training one or more machine learning models to determine emotional states associated with speech, in accordance with some embodiments of the present disclosure.

Systems and methods are disclosed related to determining emotional states for speech in conversational AI and/or digital avatar systems and applications. For instance, a system(s) may train one or more machine learning models to determine emotional states associated with speech. In some examples, the machine learning model(s) may be trained using a first training process associated with training the machine learning model(s) to determine probabilities for distributions of values that model emotional states (e.g., joint emotion mixtures). As described herein, a distribution of values may represent at least a first value (e.g., a first coefficient) associated with a first emotional state, a second value (e.g., a second coefficient) associated with a second emotional state, a third value (e.g., a third coefficient) associated with a third emotional state, and/or so forth. In some examples, the machine learning model(s) may be trained using a second training process that uses actual human feedback to better optimize the machine learning model(s). As described herein, the machine learning model (s) may be trained to determine sequences of emotional states, where a sequence of emotional states may include one emotional state, two emotional states, five emotional states, ten emotional states, and/or any other number of emotional states associated with the speech.

For more details, to train the machine learning model(s), the system(s) may initially generate, determine, and/or obtain training data associated with the first training process and/or the second training process. As described herein, the training data may include, but is not limited to, audio data representing instances of speech, data representing sequences of emotional states associated with the instances of speech, data indicating which sequences of emotional states better represent the instances of speech as compared to other sequences of emotional states, and/or data indicating whether multiple sequences of emotional states equally represent the instances of speech. In some examples, the system(s) may generate the training data using inputs from one or more users associated with the system(s).

For example, and for audio data representing an instance of speech, the system(s) may use the audio data and sequences of emotional states to generate video data representing videos depicting animated characters expressing the sequences of emotional states. For instance, the system(s) may generate at least a first video depicting an animated character expressing a first sequence of emotional states for the speech and a second video depicting an animated character expressing a second, different sequence of emotional states for the speech. One or more users may then view the videos and select which video better represents emotions for the speech. The system(s) may then use this selection to generate the training data associated with the instance of speech. Additionally, the system(s) may then perform similar processes, such as by using additional audio data representing one or more additional instances of speech, to generate additional training data.

Using at least a portion of the training data and/or other training data that associates instances of speech with one or more emotional states, the system(s) may train the machine learning model(s) using the first training process. As described herein, in some examples, the first training process may be associated with training the machine learning model(s) to determine probabilities for distributions of values that model emotional states. For example, and for audio data representing an instance of speech, the machine learning model(s) may process the audio data to generate an output. In some examples, the output is based on the current parameters of the machine learning model(s) and includes a vector, such as a vector with dimensions that depends on the number of emotional states for which the machine learning model(s) is being trained to predict. For example, the vector may represent a number of values that is associated with the number of emotional states. The system(s) may then use the output to generate a distribution that models the emotional states, such as a Dirichlet distribution (and/or any other type of distribution). As described herein, the system(s) may use one or more equations to generate the distribution based at least on the output.

The system(s) may also use the training data to generate a ground truth distribution of values that models an actual emotional state that relates to the speech. For example, the ground truth distribution of values may include a first value (e.g., 1) for the emotional state that relates to the speech and a second value (e.g., 0) for one or more (e.g., each) of the other emotional states. The system(s) may then use the distributions of values to update the parameters of the machine learning model(s). In some examples, the system(s) may use a specific type of loss to update the parameters based at least on the distributions of values, such as a log-likelihood loss (and/or any other type of loss) Additionally, the system(s) may perform similar processes for additional portions of the audio data that represent different emotional states associated with the speech and/or any number of additional instances of speech.

In some examples, the system(s) may further train the machine learning model(s) using at least a portion of the training data and the second training process. For example, and for an instance of speech, the system(s) may use the machine learning model(s) to process audio data representing the instance of speech, a first sequence of emotional states that was selected as better representing the speech as compared to a second sequence of emotional states, and/or the second sequence of emotional states. Based at least on the processing, the machine learning model(s) may generate at least a first probability associated with the first sequence of emotional states and a second probability associated with the second sequence of emotional states. In some examples, such as based on the first training process, the probabilities may be associated with distributions of values that model emotional states. The system(s) may then use the probabilities to determine one or more losses and use the loss(es) to update the parameters (e.g., weights and biases) of the machine learning model(s).

In some examples, the second training process may include using one or more techniques in order to limit the training of the machine learning model(s). For instance, the system(s) may use one or more reference machine learning models to also process the audio data representing the speech, the first sequence of emotional states, and the second sequence of emotional states. In some examples, the reference machine learning model(s) may correspond to the machine learning model(s) before any training is performed using this second training process (and/or, in some examples, the first training process). Based at least on the processing, the reference machine learning model(s) may generate at least third probability associated with the first sequence of emotional states and a fourth probability associated with the second sequence of emotional states. The system(s) may then further use these probabilities to determine the loss(es).

In some examples, such as when the sequence of emotional states includes multiple emotional states associated with the speech, the system(s) may perform these processes to determine a respective loss associated with one or more (e.g., each) portion of the audio data that is associated with a respective emotional state. The system(s) may then use the losses for the different portions to determine a final loss for updating the parameters of the machine learning model(s). For example, the system(s) may determine the final loss as an average of the losses, a median of the losses, a mode of the losses, and/or using any other algorithm. Additionally, in some examples, the system(s) may perform these processes using additional audio data representing additional instances of speech from the training data.

In some examples, the system(s) may perform both of the training processes in order to train the machine learning model(s). For example, the system(s) may perform the first training process to initially train the machine learning model(s) to determine probabilities for distributions of values that model emotional states. The system(s) may then generate a copy of the trained machine learning model(s), where the copy is referred to as the reference machine learning model(s). The system(s) may then perform the second training process using the reference machine learning model(s) in order to further train the machine learning model(s). In other words, this second training process may be used by the system(s) to further optimize the machine learning model(s) based on the user feedback. In some examples, after training, the system(s) (and/or another system(s)) may then use the machine learning model(s) to determine one or more emotional states, such as a sequence of emotional states (which may include two or more emotional states at any given instance or frame), for animating a character that is further outputting audio associated with the speech.

While the examples described herein are directed to determining sequences of emotional states associated with audio data represent speech, in other examples, similar processes may be performed to determine sequences or combinations of emotional states associated with audio data representing additional and/or alternative sounds—e.g., animal sounds, vehicle sounds, etc. Additionally, while the examples described herein are directed to training the machine learning model(s) to determine sequences and/or combinations of emotional states for animating characters, in some examples, similar processes may be used to train the machine learning model(s) to determine other types of motions or actions associated with speech. For example, similar processes may be performed to train the machine learning model(s) to determine sequences of gestures for animating characters, sequences of facial expressions for animated characters, and/or any other types of motions associated with speech.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems implementing large language models (LLMs), systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

With reference to FIG. 1, FIG. 1 illustrates an example data flow diagram for a process 100 of training one or more machine learning models 102 to determine emotional states associated with speech, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 100 may include a training data component 104 processing audio data 106 and emotions data 108. As described herein, the audio data 106 may represent one or more instances of speech (and/or other types of sound). For example, the audio data 106 may include first audio data 106 representing first speech, second audio data 106 representing second speech, third audio data 106 representing third speech, and/or so forth. Additionally, the emotions data 108 may represent one or more sequences and/or combinations of emotional states associated with one or more of the instances of the speech. For example, and for an instance of speech, the emotions data 108 may represent at least a first sequence of emotional states associated with the speech and a second, different sequence of emotional states associated with the speech.

In some examples, the emotions data 108 representing a sequence of emotional states may include one or more vectors, where a respective vector represents a respective emotional state. For example, a sequence of emotional states may be represented using a first vector that represents a first emotional state associated with a first time and/or a first keyframe of the audio data 106, a second vector that represents a second emotional state associated with a second time and/or a second keyframe associated with the audio data 106, a third vector that represents a third emotional state associated with a third time and/or a third keyframe associated with the audio data 106, and/or so forth. Additionally, as described herein, a sequence of emotional states may include one or more emotional states associated with instance of speech. For example, a sequence of emotional states may include, but is not limited to, one emotional state, two emotional states, five emotional states, ten emotional states, and/or any other number of emotional states associated with an instance of speech.

The process 100 may include the training data component 104 generating, based at least on processing the audio data 106 and the emotions data 108, training data 110. As described herein, the training data 110 may represent at least the instances of the speech, the sequences of emotional states associated with the speech, indications of which sequences of emotional states better represent the speech as compared to other sequences of emotional states, indications that sequences of emotional states equally represent the speech, and/or any other type of data. In some examples, the training data component 104 may perform one or more processes to generate the training data 110, such as by using one or more inputs from one or more users.

Figure 2:
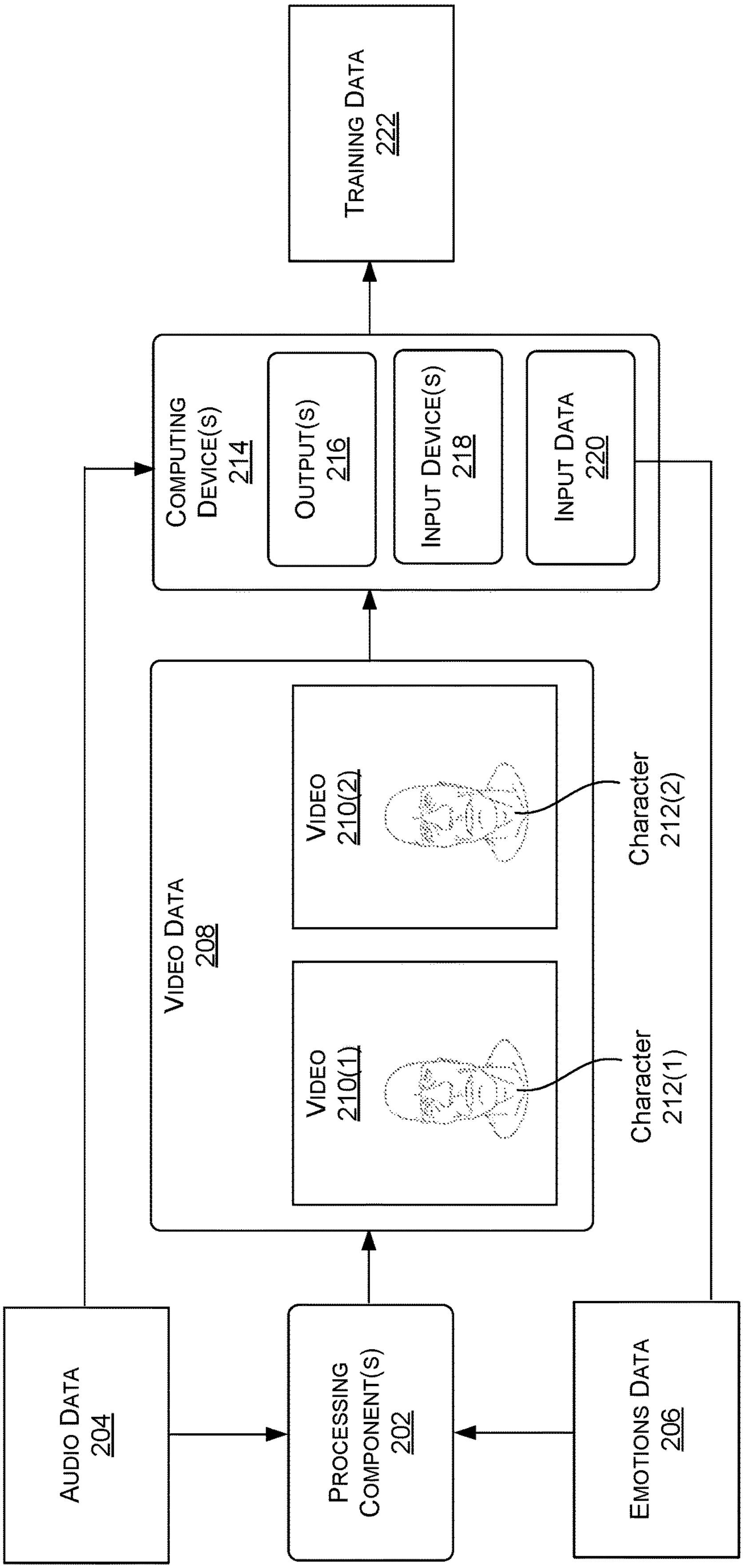
FIG. 2 illustrates an example of generating training data using audio data representing speech and sequences of emotional states associated with the speech, in accordance with some embodiments of the present disclosure.

For more details, FIG. 2 illustrates an example of generating training data using audio data representing speech and sequences of emotional states associated with the speech, in accordance with some embodiments of the present disclosure. As shown, one or more processing components 202 may process audio data 204 (which may represent, and/or include, the audio data 106) and emotions data 206 (which may represent, and/or include, the emotions data 108). Based at least on the processing, the processing component(s) 202 may generate video data 208 representing videos 210(1)-(2) depicting animated characters 212(1)-(2) performing various emotions. For example, and for an instance of speech represented by the audio data 204, the first video 210(1) may depict the first animated character 212(1) expressing emotions that are based on a first sequence of emotional states represented by the emotions data 206 and the second video 210(2) may depict the second animated character 212(2) expressing emotions that are based on a second sequence of emotional states represented by the emotions data 206. While the example of FIG. 2 only illustrates two videos 210(1)-(2) associated with a single instance of speech, in other examples, the processing component(s) 202 may generate any number of videos associated with any number of instances of speech.

As further illustrated by the example of FIG. 2, one or more computing devices 214 may receive the video data 208 and/or the audio data 204. The computing device(s) 214 may then use one or more output devices 216 to provide content to one or more users. As described herein, an output device 216 may include, but is not limited to, a display, a speaker, a haptic feedback device, and/or any other type of device. For example, the computing device(s) 214 may display the first video 210(1) using a display while also outputting, using a speaker(s), the corresponding speech represented by the audio data 204. The computing device(s) 214 may also display the second video 210(1) using a display while also outputting, using a speaker(s), the corresponding speech represented by the audio data 204. In some examples, the computing device(s) 214 displays the videos 210(1)-(2) together while, in other examples, the computing device(s) 214 displays the videos 210(1)-(2) at different times (e.g., displays the first video 210(1) followed by displaying the second video 210(2)).

The user may then use one or more input devices 218 to provide one or more inputs (which may be represented by input data 220) indicating (1) whether the first sequence of emotional states performed by the first animated character 212(1) better represents the speech as compared to the second sequence of emotional states performed by the second animated character 212(2), (2) whether the second sequence of emotional states performed by the second animated character 212(2) better represents the speech as compared to the first sequence of emotional states performed by the first animated character 212(1), or (3) whether the first sequence of emotional states performed by the first animated character 212(1) and the second sequence of emotional states performed by the second animated character 212(2) similarly represent the speech. As described herein, an input device 218 may include, but is not limited to, a mouse, a keyboard, a touch-sensitive screen, a microphone, and/or any other type of input device. For example, the user(s) may provide the input as audio data representing speech, where the computing device(s) 214 then uses one or more machine learning models to interpret the speech in order to determine the selection by the user(s).

As further illustrated by the example of FIG. 2, based at least on the input(s) from the user(s), the computing device(s) 214 may generate training data 222 (which may represent, and/or include, the training data 110) representing at least the speech, the sequences of emotional states, and/or the selection(s) made by the user(s) (e.g., which sequence of emotional states better represents the speech and/or whether the sequences of emotional states equally represent the speech). Additionally, the processing component(s) 202 and/or the computing device(s) 214 may perform similar processes to generate additional training data 222 associated with one or more additional instances of speech.

Referring back to the example of FIG. 1, while these examples describe the training data component 104 as generating the training data 110 using inputs from the user(s), in other examples, the training data component 104 may use any other technique to generate at least a portion of the training data 110. For example, and for an instance of speech, the training data component 104 may use any other technique to determine one or more sequences of emotional states associated with the instance of speech, determine which sequence of emotional states better represents the speech as compared to another sequence of emotional states, determine whether two sequences of emotional states equally represent the speech, and/or the like.

The process 100 may include using a distribution training component 112 to train the machine learning model(s) 102 using a first training process. As described herein, the first training process may be associated with causing the machine learning model(s) 102 to determine probabilities for distributions of values that model emotional states (e.g., a mixture of emotions). For example, and for audio data 106 representing an instance of speech, the distribution training component 112 may cause the machine learning model(s) 102 to process the audio data 106 and, based at least on the processing, generate an output. In some examples, the output is based on the current parameters 114 of the machine learning model(s) 102 and includes a vector, such as a vectors with a number of dimensions that depends on the number of emotional states for which the machine learning model(s) 102 is being trained. For example, if the machine learning model(s) is being trained to determine six emotional states, then the vector may include six dimensions. The distribution training component 112 may then use the output to generate a distribution of emotional states, such as a Dirichlet distribution (and/or any other type of distribution). As described herein, the optimization training component 112 may use one or more equations to generate the distribution of emotional states based at least on the output.

The distribution training component 112 may also use the training data 110 to generate a ground truth distribution of values that models the emotional states. For example, the ground truth distribution may include a first value (e.g., 1) for the emotional state that relates to the audio data 106 (e.g., the speech) and a second value (e.g., 0) for one or more (e.g., each) of the other emotional states. The distribution training component 112 may then use the distributions of values to update the parameters 114 of the machine learning model(s) 102 to generate updated parameters 116. In some examples, the distribution training component 112 may use a specific type of loss to update the parameters 114 based at least on the distributions of values, such as a log-likelihood loss (and/or any other type of loss) Additionally, the distribution training component 112 may perform similar processes for additional portions of the audio data 106 that represent different emotional states associated with the speech and/or any number of additional instances of speech.

Figure 3:
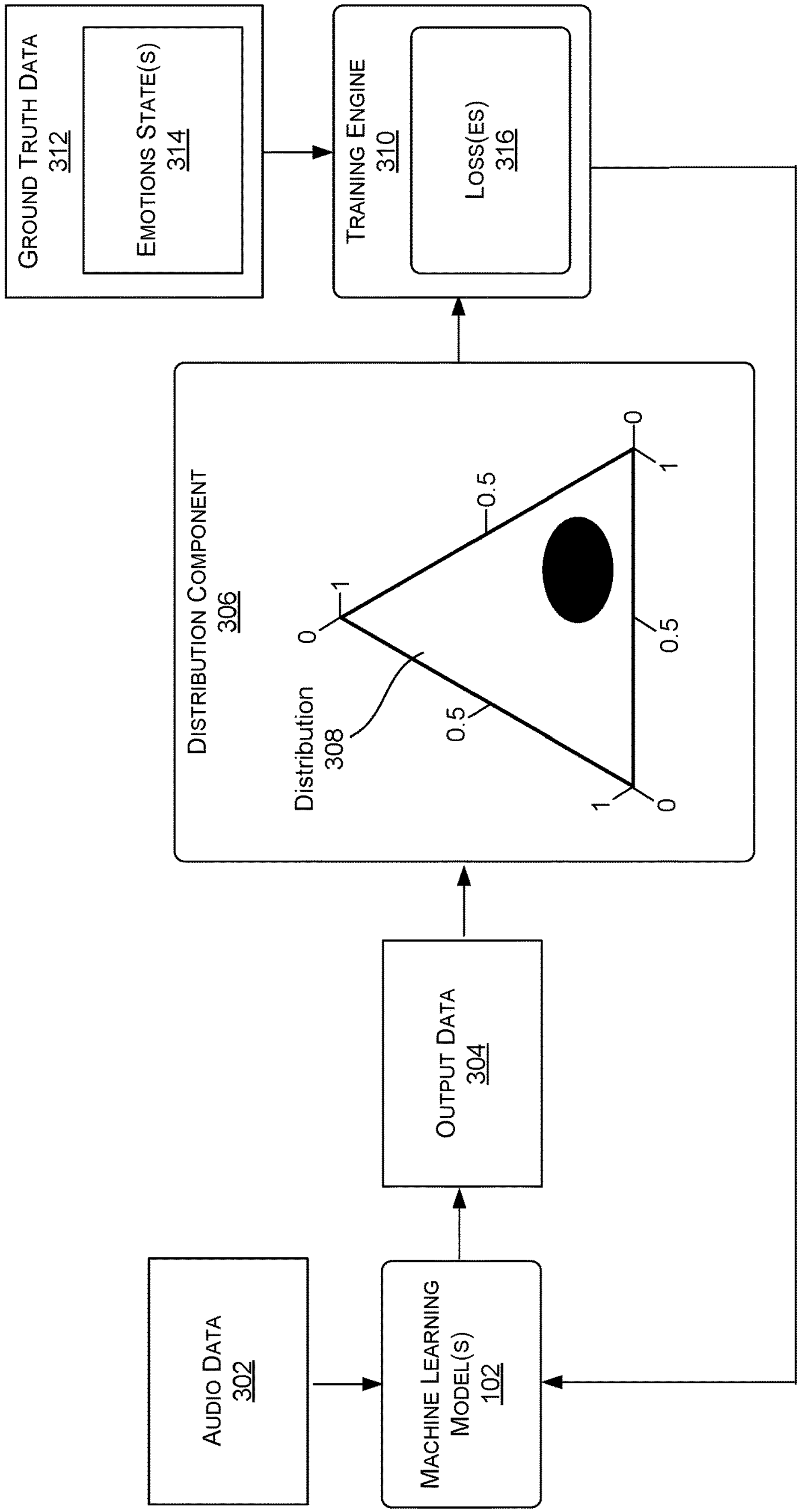
FIG. 3 illustrates an example of training one or more machine learning models to generate probabilities for distributions of values that model emotional states, in accordance with some embodiments of the present disclosure.

For more details, FIG. 3 illustrates an example of training one or more machine learning models to generate probabilities for distributions of values that model emotional states, in accordance with some embodiments of the present disclosure. As shown, the distribution training component 112 may train the machine learning model(s) 102 using at least audio data 302 (which may represent, and/or include, the audio data 106). As described herein, the audio data 106 may represent one or more instances of speech (and/or other sounds).

The machine learning model(s) 102 may process the audio data 302 and, based at least on the processing, generate output data 412 representing a vector v. In some examples, the vector may be represented as $v=(v_1, v_2, \ldots, v_N)$, where N may be associated with a number of parameters and/or a number of emotional states for which the machine learning model(s) 102 is configured to determine values. For instance, in the example of FIG. 3, N may include three based on the machine learning model(s) 102 being configured to determine a distribution of values for three emotional states (e.g., happy, sad, neutral). However, in other example, N may include any other value, such as one, six, ten, twenty, and/or so forth.

A distribution component 306 may then use the output 304 from the machine learning model(s) 102 to generate a distribution 308. As described herein, in some examples, the distribution component 306 may use one or more algorithms to generate the distribution 308 based at least on the output 304. Additionally, in the example of FIG. 3, the distribution 308 may include a Dirichlet distribution with three dimensions (e.g., based on N). As such, the distribution may represent three values associated with the three emotional states, where the three values sum to a specific value, such as 1. For example, if the three emotional states include happy plotted on the right (e.g., $x_1$), sad plotted on the left (e.g., $x_2$), and neutral plotted on the bottom (e.g., $x_3$), then the values may include 0.1 for happy, 0.4 for sad, and 0.5 for neutral. In some examples, this is represented by the shading of the distribution, where the lighter colors indicate lower probabilities and/or likelihoods and the darker colors indicate higher probabilities and/or likelihoods.

For instance, during this first training process, the machine learning model(s) 102 may predict the parameters using the following function:

$$\text{Emotion} \sim Dir(\text{Emotion} \mid \alpha(\text{Audio} \mid \theta)) \tag{1}$$

In function (1), $\alpha(\text{Audio}|\theta)$ may represent the set of parameters for the Dirichlet distribution and $\alpha$ may represent the machine learning model(s) 102 that is predicting the parameters based at least on the provided audio data 302 and the trainable parameters $\theta$.

A training engine 310 may use the distribution 308 and ground truth data 312 representing at least an emotional state 314 associated with the audio data 302 to determine one or more losses 316. As described herein, the training engine 310 may determine the loss(es) 316 based at least on a comparison of the distribution 308 and another distribution of values that models the emotional state 314 represented by the ground truth data 312. For instance, the additional distribution may include a first value for the emotional state 314, such as 1, and a second value for one or more other emotional states, such as 0. For example, and in the example of FIG. 3, if the emotional state 314 includes neutral, then the additional distribution may include 0 for happy, 0 for sad, and 1 for neutral. In some examples, the training engine 310 may use any type of loss function to determine the loss(es), such as Dirichlet log-likelihood loss (and/or any other type of loss). For example, the training engine 310 may use the following function:

$$\frac{1}{N}\sum_{i=1}^{N}\log Dir\left(\text{Emotion}_i \mid \alpha(\text{Audio}_i \mid \theta)\right) \to \max_{\theta} \tag{2}$$

In function (2), the training engine 310 may maximize the log-likelihood of the distribution 308 on the training dataset of pairs ($\text{Audio}_i$, $\text{Emotion}_i$).

As further illustrated by the example of FIG. 3, the training engine 310 may then use the loss(es) 316 to update the parameters 114 of the machine learning model(s) 102. Additionally, this first training process may continue to repeat for any number of emotional states 314 associated with the speech represented by the audio data 302 and/or any number of instances or frames (e.g., including audio/visual content) of speech represented by additional audio data 302. As such, after performing this first training process, the machine learning model(s) 102 may be trained to determine probabilities of distributions of values that model emotional states.

Referring back to the example of FIG. 1, the process 100 may include using an optimization training component 118 to train the machine learning model(s) 102 using a second training process. As described herein, in some examples, the second training process may be associated with optimizing the machine learning model(s) 102 based at least on user feedback. For example, and for an instance of speech, the optimization training component 118 may use the machine learning model(s) 102 to process audio data 106 representing the instance of speech, a first sequence of emotional states that was selected as better representing the speech as compared to a second sequence of emotional states, and/or the second sequence of emotional states. Based at least on the processing, the machine learning model(s) 102 may generate at least a first probability associated with the first sequence of emotional states and a second probability associated with the second sequence of emotional states. In some examples, such as based on the first training process, the probabilities may be associated with distributions of values that model emotional states. The optimization training component 118 may then use the probabilities to determine one or more losses and use the loss(es) to update the parameters 116 of the machine learning model(s) 102.

In some examples, the second training process may also include using one or more techniques in order to limit the training of the machine learning model(s) 102. For instance, the optimization training component 118 may use one or more reference machine learning models to also process the audio data 106 representing the speech, the first sequence of emotional states, and the second sequence of emotional states. In some examples, the reference machine learning model(s) may correspond to the machine learning model(s) 102 before any training is performed using this second training process (and/or in some examples, before any training is performed using the first training process). Based at least on the processing, the reference machine learning model(s) may generate at least third probability associated with the first sequence of emotional states and a fourth probability associated with the second sequence of emotional states. The optimization training component 118 may then further use these probabilities to determine the loss(es).

In some examples, such as when the sequences of emotional states include multiple emotional states associated with the speech, the optimization training component 118 may perform these processes to determine a respective loss associated with one or more (e.g., each) portion of the audio data 106 that is associated with a respective emotional state. The optimization training component 118 may then use the losses for the different portions to determine a final loss for updating the parameters 116 of the machine learning model(s) 102. For example, the optimization training component 118 may determine the final loss as an average of the losses, a median of the losses, a mode of the losses, and/or using any other algorithm. Additionally, in some examples, the optimization training component 118 may perform these processes using additional audio data 106 representing additional instances of speech from the training data 110.

Figure 4:
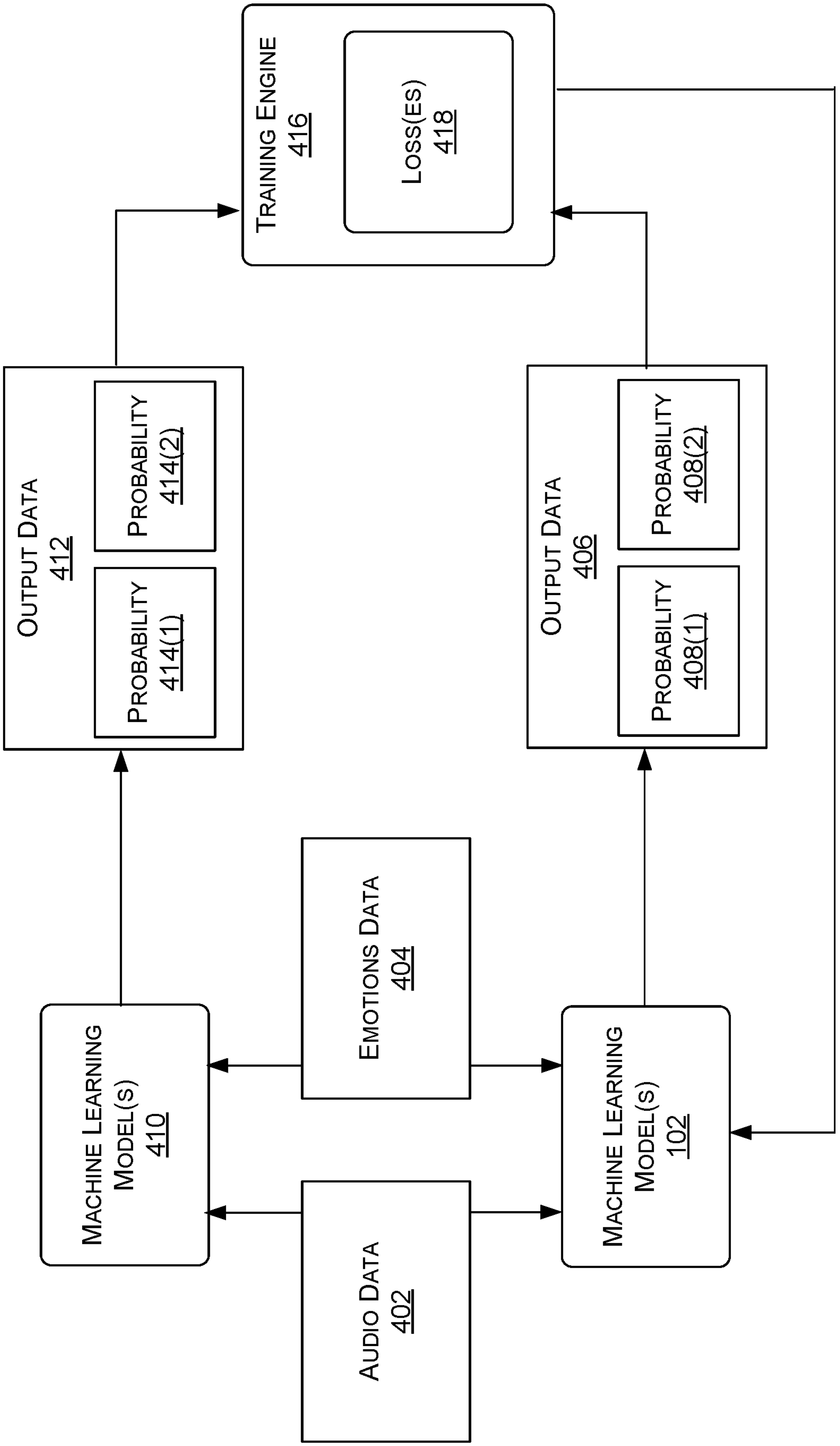
FIG. 4 illustrates an example of training one or more machine learning models using user feedback, in accordance with some embodiments of the present disclosure.

For more details, FIG. 4 illustrates an example of training the machine learning model(s) 102 using user feedback, in accordance with some embodiments of the present disclosure. As shown, the optimization training component 118 may train the machine learning model(s) 102 using at least audio data 402 (which may represent, and/or include, the audio data 106) and/or emotions data 404 (which may represent, and/or include, the emotions data 108). As described herein, the audio data 106 may represent one or more instances of speech (and/or other sounds). Additionally, the emotions data 404 may represent sequences of emotional states associated with the speech represented by the audio data 402, an indication that one of the sequences of emotional states better represents the speech as compared to another sequence of emotional states, and/or an indication that both sequences of emotional states equally represents the speech.

The machine learning model(s) 102 may be configured to process the audio data 402 and/or the emotions data 404 and, based at least on the processing, generate output data 406. In some examples, and as shown by the example of FIG. 4, the output data 406 may represent at least a first probability 408(1) associated with the first sequence of emotional states and a second probability 408(2) associated with the second sequence of emotional states. As such, in some examples, the first probability 408(1) may be associated with the first sequence of emotional states that better represents the audio data 402 as compared to the second sequence of emotional states for which the second probability 408(2) is associated. Additionally, in some examples, such as based on the first training process, the probabilities 408(1)-(2) may be associated with distributions of values that model emotional states, such as described with respect to the example of FIG. 3.

In some examples, and as also shown by the example of FIG. 4, one or more reference machine learning models 410 may also process the audio data 402 and/or the emotions data 404 and, based at least on the processing, generate output data 412. In some examples, and as shown by the example of FIG. 4, the output data 412 may represent at least a first probability 414(1) associated with the first sequence of emotional states and a second probability 414(2) associated with the second sequence of emotional states. As such, in some examples, the first probability 414(1) may be associated with the first sequence of emotional states that better represents the audio data 402 as compared to the second sequence of emotional states for which the second probability 414(2) is associated. Additionally, in some examples, such as based on the first training process, the probabilities 414(1)-(2) may be associated with distributions of values that model emotional states, such as described with respect to the example of FIG. 3.

A training engine 416 may use the output data 406 and/or the output data 412 to determine one or more losses 418 associated with the audio data 402. In some examples, the training engine 416 may use one or more functions when determining the loss(es) 418. For instance, the training engine 416 may use the following function:

$$\mathcal{L}_{DPO}(\pi_\theta;\pi_{ref}) = -\mathbb{E}_{(x,y_w,y_l)\sim D}\left[\log\sigma\left(\beta\log\frac{\pi_\theta(y_w\mid x)}{\pi_{ref}(y_w\mid x)} - \beta\log\frac{\pi_\theta(y_l\mid x)}{\pi_{ref}(y_l\mid x)}\right)\right] \quad (3)$$

In function (3), $\sigma_\theta(y|x)$ is the machine learning model(s) 102 that is being trained, θ is the trainable parameters (e.g., the parameters 116), y is the output (e.g., a next prediction in context of the model), x is a condition (e.g., one or more previous words, such as in a sentence), $\pi_{ref}(y|x)$ is the reference machine learning model(s) 410, $y_w$ is the preferred output (e.g., the sequence of emotional states that is more related to the audio data 402 based on user input), $y_i$ is the unpreferred output (e.g., the sequence of emotional states that is less related to the audio data 402 based on user input), σ is a function (e.g., a sigmoid function), and β is a hyperparameter. As shown, based on function (3), the less the value of β, the further the machine learning model(s) 102 will be from the reference machine learning model(s) 410 after training and the greater the value of β, the closer the machine learning model(s) 102 will be to the reference machine learning model(s) 410 after training. In some examples, this may be because the training engine 416 determines a smaller loss(es) 418 and/or provides less updates to the parameters when the value of β is small, but determines a larger loss(es) 418 and/or provides more updates to the parameters when the value of β is large. Additionally, $\mathbb{E}_{(x,y_w,y_l)}\sim D$ may represent the expected value over all datasets D. In some examples, the expected value may be averaged across one or more user feedback datasets.

As such, in function (3), $\pi_\theta(y_w|x)$ may represent the first probability 408(1) associated with the first sequence of emotional states, $\pi_\theta(y_l|x)$ may represent the second probability 408(2) associated with the second sequence of emotional states, $\pi_{ref}(y_w|x)$ may represent the first probability 414(1) associated with the first sequence of emotional states, and $\pi_{ref}(y_l|x)$ may represent the second probability 414(2) associated with the second sequence of emotional states. In some examples, and using function (3), the greater the probabilities 408(1) and 414(1) as compared to the probabilities 408(2) and 414(2), the smaller the loss(es) 418 since the machine learning model(s) 102 and/or the reference machine learning model(s) 410 is more accurately determining the sequences of emotional states. Additionally, the greater the probabilities 408(2) and 414(2) as compared to the probabilities 408(1) and 414(1), the larger the loss(es) 418 since the machine learning model(s) 102 and/or the reference machine learning model(s) 410 is less accurately determining the sequences of emotional states.

As further shown by the example of FIG. 4, the training engine 416 may use the loss(es) 418 to update the parameters of the machine learning model(s) 102. Additionally, the training engine 416 may continue to determine losses 418 for additional instances of speech and continue updating the machine learning model(s) 102 using the additional losses 418. However, and as also shown by the example of FIG. 4, the training engine 416 may not update the parameters of the reference machine learning model(s) 410 during training, which may be similar to the machine learning model(s) 102 before this second training process, in order to continue limiting the amount of updating that may occur to the machine learning model(s) 102.

Referring back to the example of FIG. 1, the process 100 may include outputting the machine learning model(s) 102 that includes updated parameters 120 based at least on the training. While the example of FIG. 1 illustrates training the machine learning model(s) 102 using both the distribution training component 112 (e.g., the first training process) and the optimization training component 118 (e.g., the second training process), in some examples, the process 100 may include training the machine learning model(s) 102 using one of the distribution training component 112 (e.g., the first training process) or the optimization training component 118 (e.g., the second training process). Additionally, while the example of FIG. 1 illustrates training the machine learning model(s) 102 using the distribution training component 112 (e.g., the first training process) followed by the optimization training component 118 (e.g., the second training process), in some examples, the process 100 may include training the machine learning model(s) 102 using the distribution training component 112 (e.g., the first training process) after training the machine learning model(s) 102 using the optimization training component 118 (e.g., the second training process).

While the examples described herein are directed to training the machine learning model(s) 102 to determine sequences of emotional states for animating characters, in some examples, similar processes may be used to train the machine learning model(s) 102 to determine other types of motions associated with speech. For example, similar processes may be performed to train the machine learning model(s) 102 to determine sequences of gestures for animating characters, sequences of facial expressions for animated characters, and/or any other types of motions associated with speech. In such an example, the training data 110 may be associated with the type of motion for which the machine learning model(s) 102 is being trained.

Figure 5:
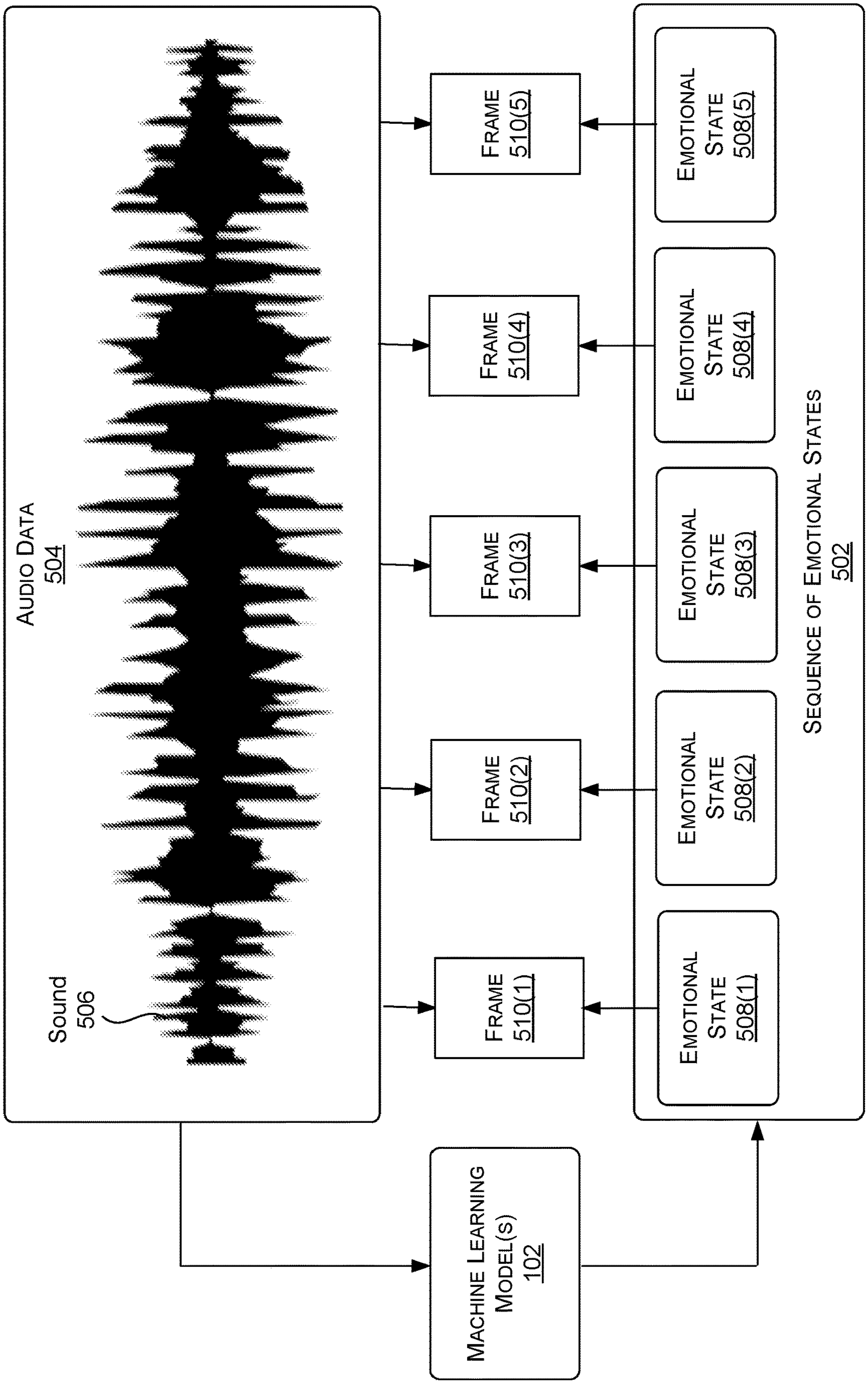
FIG. 5 illustrates an example of determining a sequence of emotional states associated with speech, in accordance with some embodiments of the present disclosure.

As described herein, in some examples, the machine learning model(s) 102 may be used to determine a sequence of emotional states that includes multiple emotional states. For instance, FIG. 5 illustrates an example of determining a sequence of emotional states 502 associated with speech, in accordance with some embodiments of the present disclosure. As shown, the machine learning model(s) 102 may process audio data 504 representing sound 506 (e.g., speech). Based at least on the processing, the machine learning model(s) 102 may determine the sequence of emotional states 502 associated with the sound 506. As shown, the sequence of emotional states 502 includes emotional states 508(1)-(5) (also referred to singularly as "emotional state 508" or in plural as "emotional states 508"). While the example of FIG. 5 illustrates the sequence of emotional states 502 as including the five emotional states 508, in other examples, a sequence of emotional states may include any number of emotional states.

As described herein, an emotional state 508 may include, but is not limited to, anger, disgust, fear, joy, neutral, sad, happy, scared, and/or any other type of emotional state. In some examples, the emotional states 508 may be associated with different times and/or keyframes associated with the audio data 504. For example, the first emotional state 508(1) may be associated with a first time and/or a first keyframe 510(1), the second emotional state 508(2) may be associated with a second time and/or a second keyframe 510(2), the third emotional state 508(3) may be associated with a third time and/or a third keyframe 510(3), the fourth emotional state 508(4) may be associated with a fourth time and/or a fourth keyframe 510(4), and/or the fifth emotional state 508(5) may be associated with a fifth time and/or a fifth keyframe 510(5). In some examples, the timesteps between the emotional states 508 and/or the number of frames between the keyframes may be similar. In some examples, the timesteps between the emotional states 508 and/or the number of frames between the keyframes may differ.

Figure 6:
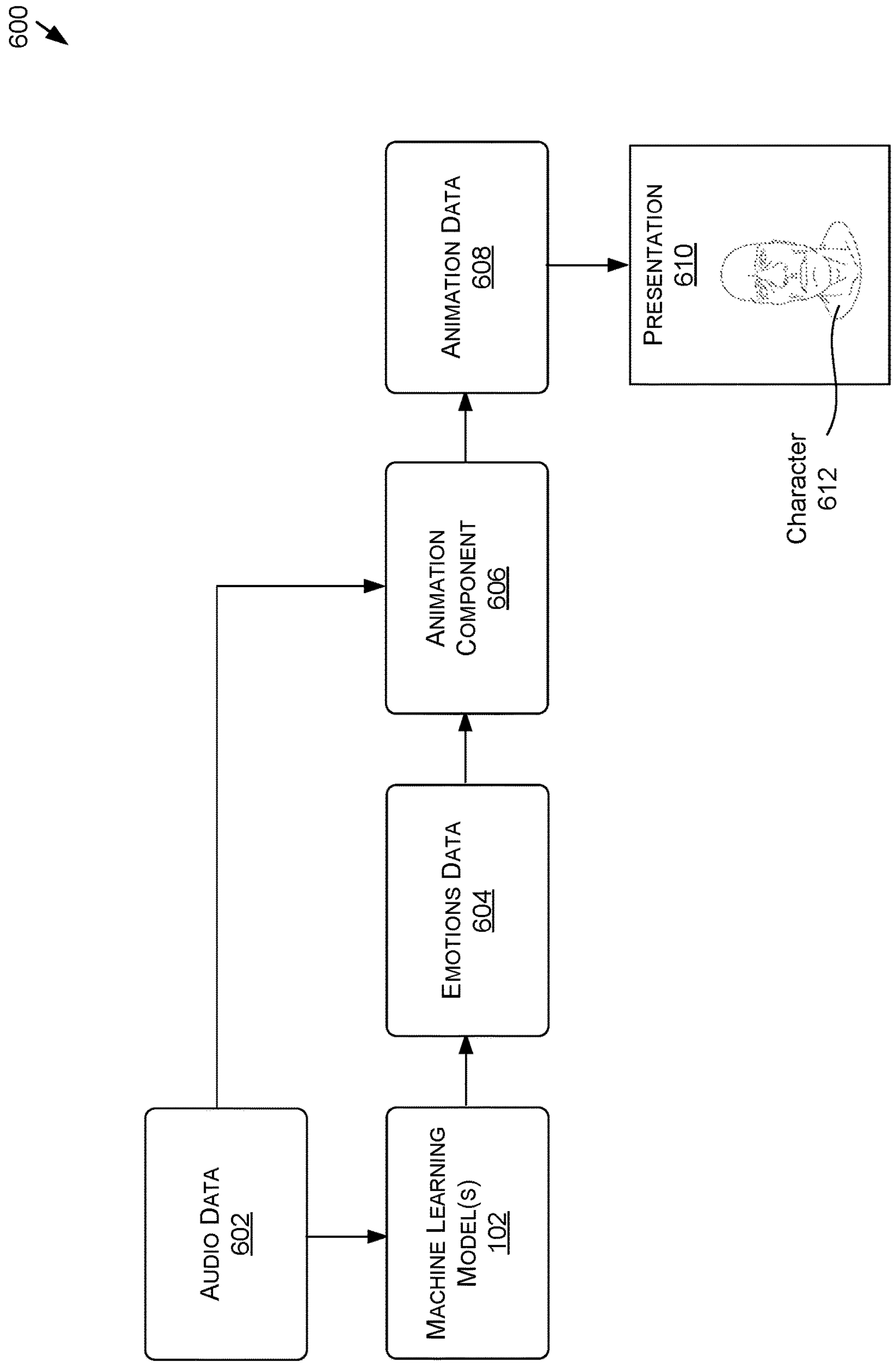
FIG. 6 illustrates an example data flow diagram for a process of animating a character using a sequence of emotional states, in accordance with some embodiments of the present disclosure.

FIG. 6 illustrates an example data flow diagram for a process 600 of animating a character, in accordance with some embodiments of the present disclosure. As shown, the process 600 may include the machine learning model(s) 102 processing audio data 602 representing speech (e.g., in the form of audio, or in the form of a spectrogram, such as a mel-spectrogram, or the like). As described herein, the speech may include human generated speech, machine generated speech, and/or any other type of speech. Based at least on the processing, the machine learning model(s) 102 may generate emotions data 604 representing a sequence of emotional states associated with the speech. For example, the sequence of emotional states may include at least a first emotional state associated with a first portion of the speech, a second emotional state associated with a second portion of the speech, a third emotional state associated with a third portion of the speech, and/or so forth.

The process 600 may then include an animation component 606 processing at least the audio data 602 and the emotions data 604 in order to generate animation data 608.

As described herein, the animation component 606 may include a machine learning model, a neural network, and/or any other type of component that is configured to perform the processes described herein. Additionally, the animation data 608 may represent a presentation 610 that includes an animated character 612 that is animated according to the sequence of emotional states and the speech represented by the audio data 602. For example, the animated character 612 may portray the first emotional state during the first portion of the speech, the second emotional state during the second portion of the speech, the third emotional state during the third portion of the speech, and/or so forth.

Now referring to FIGS. 7-10, each block of methods 700, 800, 900, and 1000, described herein, comprises a computing process that may be performed using any combination of hardware, firmware, and/or software. For instance, various functions may be carried out by a processor executing instructions stored in memory. The methods 700, 800, 900, and 1000 may also be embodied as computer-usable instructions stored on computer storage media. The methods 700, 800, 900, and 1000 may be provided by a standalone application, a service or hosted service (standalone or in combination with another hosted service), or a plug-in to another product, to name a few. In addition, the methods 700, 800, 900, and 1000 are described, by way of example, with respect to FIGS. 1 and 6. However, these methods 700, 800, 900, and 1000 may additionally or alternatively be executed by any one system, or any combination of systems, including, but not limited to, those described herein.

Figure 7:
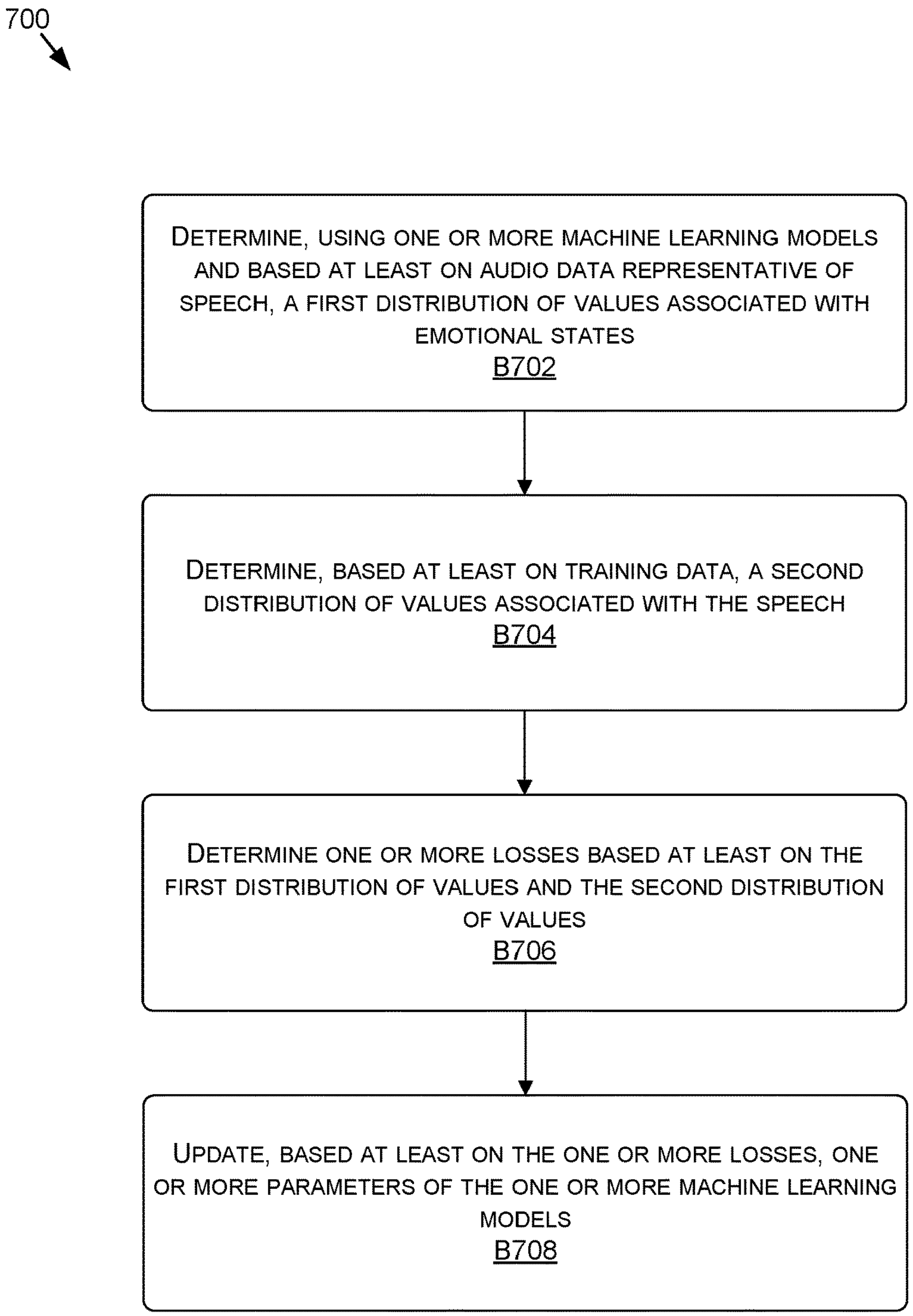
FIG. 7 illustrates a flow diagram showing a method for training one or more machine learning models to determine probabilities for distributions of values that model emotional states, in accordance with some embodiments of the present disclosure.

FIG. 7 illustrates a flow diagram showing a method 700 for training one or more machine learning models to determine probabilities for distributions of values that model emotional states, in accordance with some embodiments of the present disclosure. The method 700, at block B702, may include determining, using one or more machine learning models and based at least on audio data representative of speech, a first distribution of values associated with emotional states. For instance, the distribution training component 112 may apply at least the audio data 106 representing the speech to the machine learning model(s) 102. Based at least on processing the audio data 106, the machine learning model(s) 102 may output data, such as data representing a vector. The distribution training component 112 may then process the output in order to generate the first distribution of values that model the emotional states.

The method 700, at block B704, may include determining, based at least on training data, a second distribution of values associated with the speech. For instance, the distribution training component 112 may use the training data 110 to generate the second distribution of values. As described herein, in some examples, the distribution training component 1121 may generate the second distribution of values by assigning a first value (e.g., 1) to the emotional state related to the speech and assigning a second value (e.g., 0) to one or more other emotional states not related to the speech. For example, if the emotional state is sad, then the distribution training component 112 may generate the second distribution of values such that sad is associated with the first value and other emotional states, such as happy, angry, and/or so forth, are associated with the second value.

The method 700, at block B706, may include determining one or more losses based at least on the first distribution of values and the second distribution of values. For instance, the distribution training component 112 may determine the loss(es) based at least on the first distribution of values and the second distribution of losses. In some examples, the distribution training component 112 may use one or more functions when determining the loss(es), such as a function associated with log-likelihood loss (and/or any other function).

The method 700, at block B708, may include updating, based at least on the one or more losses, one or more parameters of the one or more machine learning models. For instance, the distribution training component 112 may update the parameter(s) 114 of the machine learning model(s) 102 using the loss(es) in order to generate the parameter(s) 116 for the machine learning model(s) 102. Additionally, the method 700 may continue to repeat for any number of emotional states associated with the speech and/or any number of instances of speech.

Figure 8:
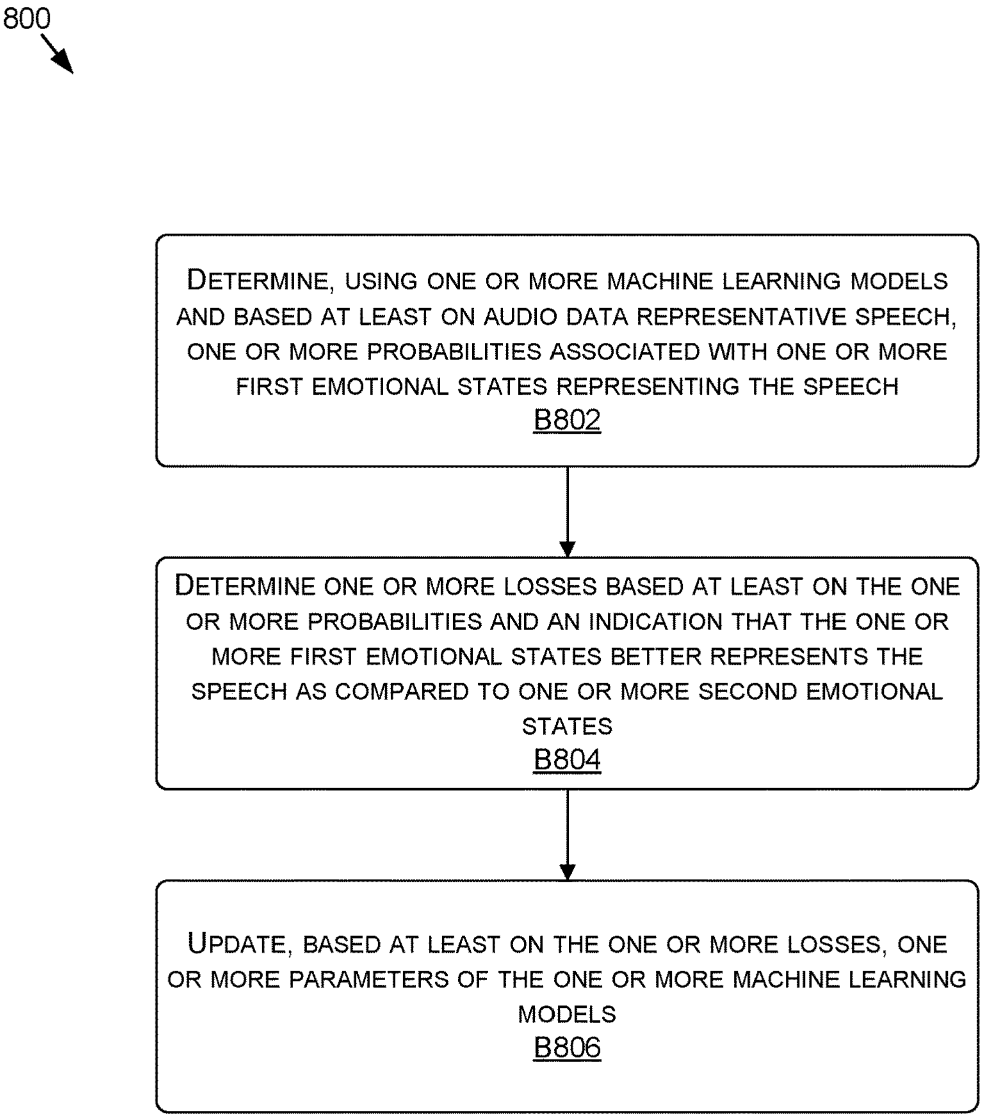
FIG. 8 illustrates a flow diagram showing a method for training one or more machine learning models using user feedback, in accordance with some embodiments of the present disclosure.

FIG. 8 illustrates a flow diagram showing a method 800 for training one or more machine learning models using user feedback, in accordance with some embodiments of the present disclosure. The method 800, at block B802, may include determining, using one or more machine learning models and based at least on audio data representative of speech, one or more probabilities associated with one or more first emotional states representing the speech. For instance, the optimization training component 118 may apply the audio data 106 and/or the emotions data 108 to the machine learning model(s) 102. The machine learning model(s) 102 may then process the audio data 106 and/or the emotions data 108 and, based at least on the processing, determine the one or more probabilities associated with the first emotional state(s). Additionally, in some examples, the machine learning model(s) 102 may determine one or more probabilities associated with one or more second emotional states. Furthermore, in some examples, one or more reference neural networks may determine one or more probabilities associated with the first emotional state(s) and/or one or more probabilities associated with the second emotional state(s).

The method 800, at block B804, may include determining one or more losses based at least on the one or more probabilities and an indication that the one or more first emotional states better represents the speech as compared to one or more second emotional states. For instance, the optimization training component 118 may determine the loss(es) based at least on the one or more probabilities and the indication of that the first emotional state(s) better represents the speech as compared to the second emotional state(s). As described herein, in some examples, the loss(es) may be based on differences between the one or more probabilities associated with the first emotional state(s) and the one or more probabilities associated with the second emotional state(s).

The method 800, at block B806, may include updating, based at least on the one or more losses, one or more parameters of the one or more machine learning models. For instance, the optimization training component 118 may update the parameter(s) 116 of the machine learning model(s) 102 using the loss(es) in order to generate the parameter(s) 120 for the machine learning model(s) 102. Additionally, the method 800 may continue to repeat for any number of emotional states associated with the speech and/or any number of instances of speech.

Figure 9:
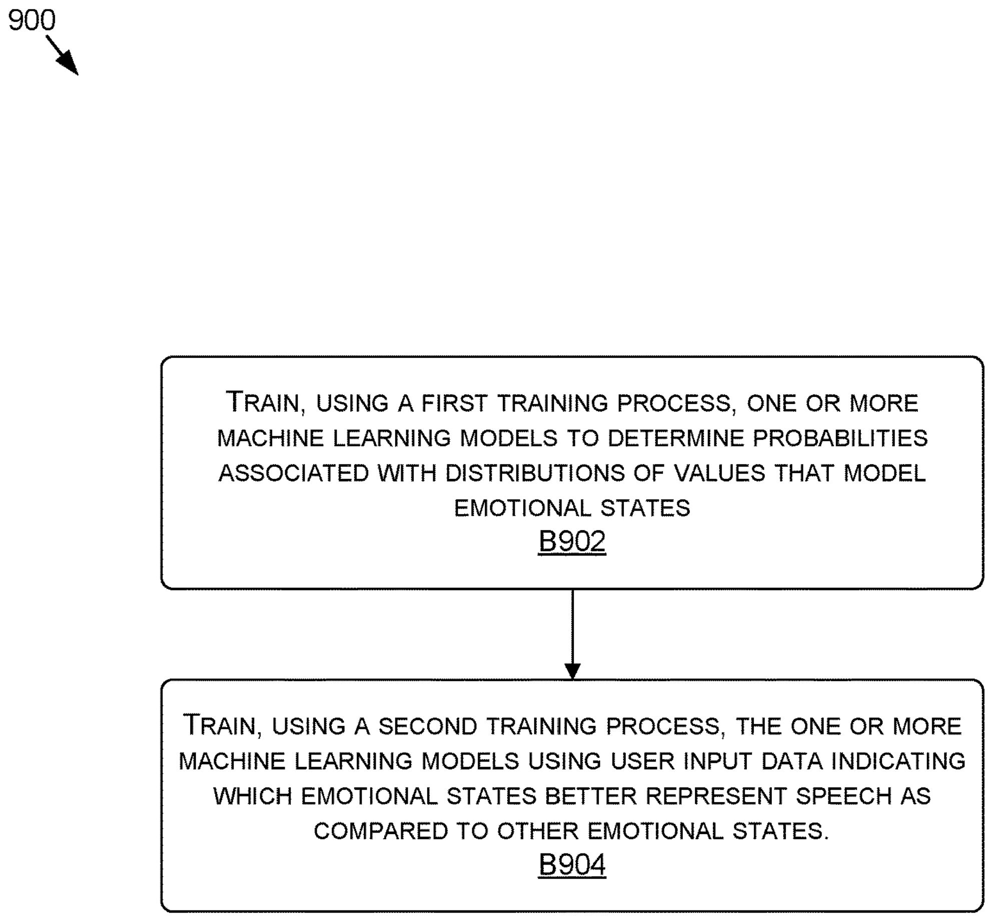
FIG. 9 illustrates a flow diagram showing a method for using multiple training processes to train one or more machine learning models to determine emotional states, in accordance with some embodiments of the present disclosure.

FIG. 9 illustrates a flow diagram showing a method 900 for using multiple training processes to train one or more machine learning models to determine emotional states, in accordance with some embodiments of the present disclosure. The method 900, at block B902, may include training, using a first training process, one or more machine learning models to determine probabilities associated with distributions of values that model emotional states. For instance, the distribution training component 112 may train the machine learning model(s) 102 using the first training process. As described herein, based at least on the training, the machine learning model(s) 102 may be trained to determine probabilities associated with the distributions of values associated with the emotional states.

The method 900, at block B904, may include training, using a second training process, the one or more machine learning models using input data indicating which emotional states better represent speech as compared to other emotional states. For instance, the optimization training component 118 may train the machine learning model(s) 102 using the second training process. As described herein, the second training process may use user feedback that indicates that the emotional states better represent the speech as compared to the other emotional states. In some examples, based at least on the training, the machine learning model(s) 102 may be more optimized to determine sequences of emotional states.

Figure 10:
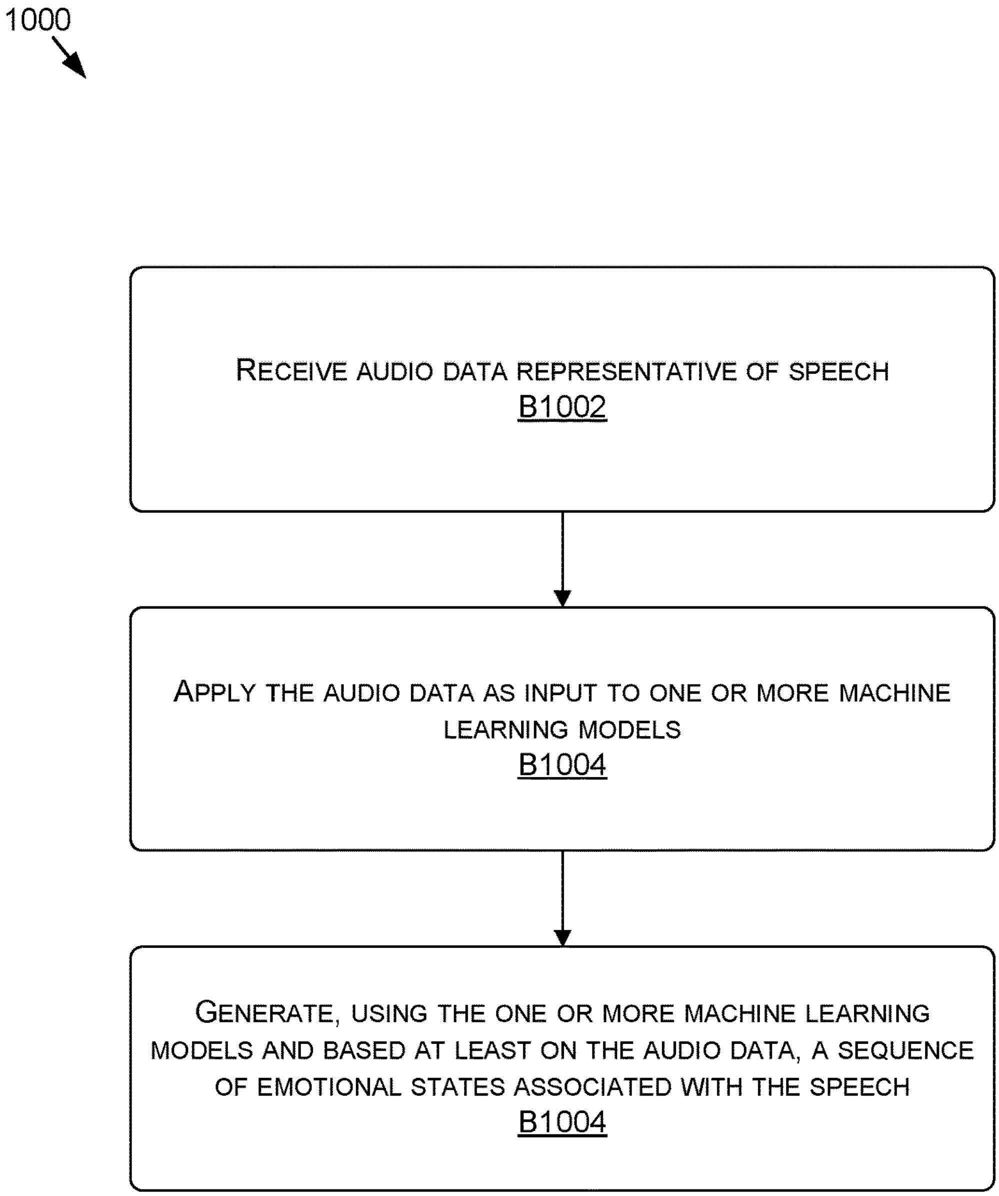
FIG. 10 illustrates a flow diagram showing a method for determining a sequence of emotional states associated with speech, in accordance with some embodiments of the present disclosure.

FIG. 10 illustrates a flow diagram showing a method 1000 for determining a sequence of emotional states associated with speech, in accordance with some embodiments of the present disclosure. The method 1000, at block B1002, may include receiving audio data representative of speech. For instance, the machine learning model(s) 102 may receive the audio data 602 representative of the speech. As described herein, the speech may include human generated speech, machine generated speech, and/or any other type of speech. In some examples, the speech is configured to be output using the animated character 612. In some examples, the audio data may be pre-processed to put the audio data into a different format suitable for processing using a machine learning model. For example, the audio may be converted to a visual representation such as a spectrogram.

The process 1000, at block B1004, may include applying the audio data as input to one or more machine learning models. For instance, the audio data 602 may be input into the machine learning model(s) 102.

The process 1000, at block B1006, may include generating, using the one or more machine learning models and based at least on the audio data, a sequence of emotional states associated with the speech. For instance, the machine learning model(s) 102 may process the audio data 602 and, based at least on the processing, generate the emotions data 604 representing the sequence of emotional states. In some examples, the emotions data 604 may then be used to animate the character 612. For example, the emotions data 604 may be used to cause the character 5612 to express the emotional states associated with the sequence of emotional states while the speech is also being output.

Example Computing Device

Figure 11:
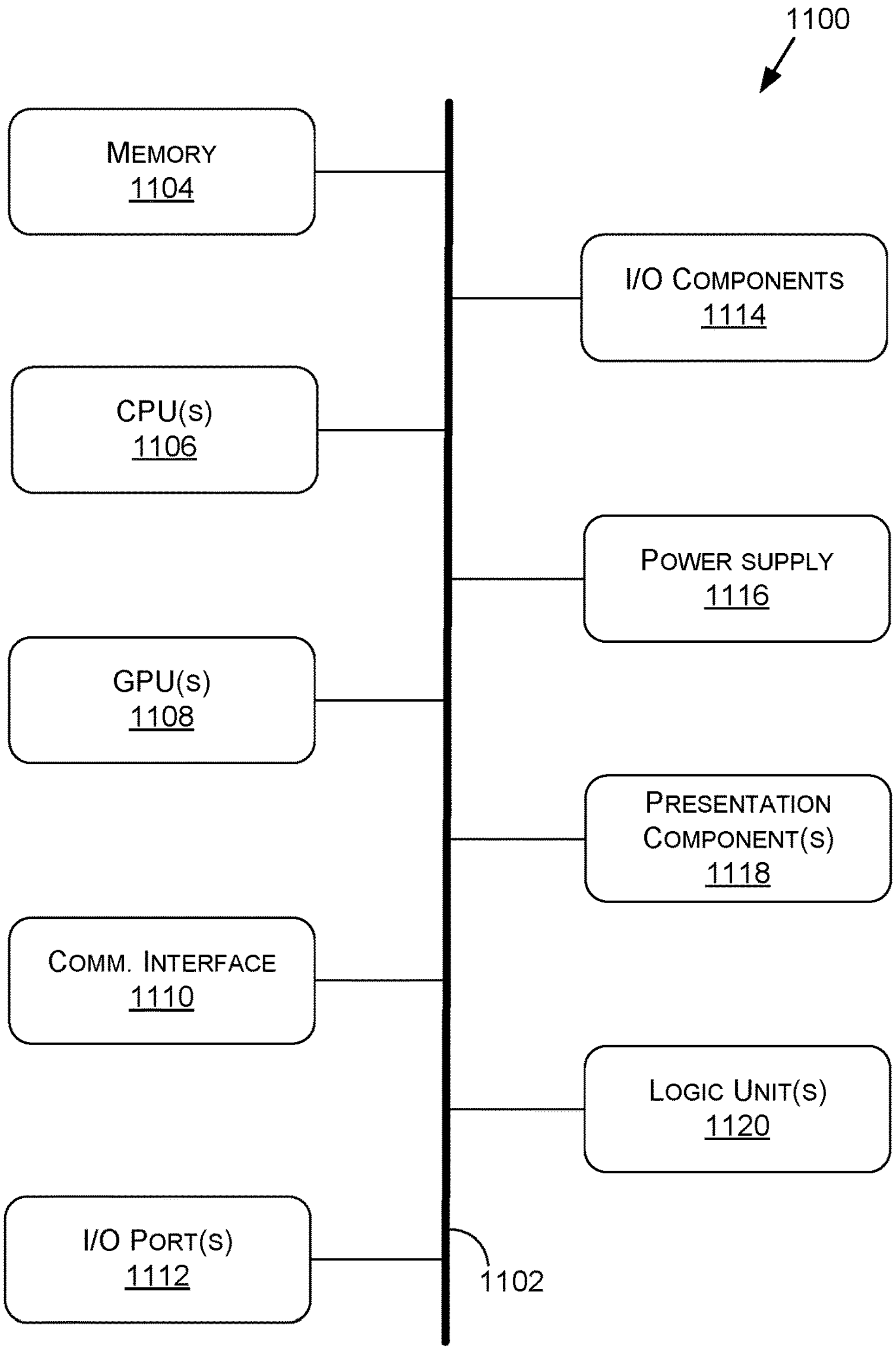
FIG. 11 is a block diagram of an example computing device suitable for use in implementing some embodiments of the present disclosure.

FIG. 11 is a block diagram of an example computing device(s) 1100 suitable for use in implementing some embodiments of the present disclosure. Computing device 1100 may include an interconnect system 1102 that directly or indirectly couples the following devices: memory 1104, one or more central processing units (CPUs) 1106, one or more graphics processing units (GPUs) 1108, a communication interface 1110, input/output (I/O) ports 1112, input/output components 1114, a power supply 1116, one or more presentation components 1118 (e.g., display(s)), and one or more logic units 1120. In at least one embodiment, the computing device(s) 1100 may comprise one or more virtual machines (VMs), and/or any of the components thereof may comprise virtual components (e.g., virtual hardware components). For non-limiting examples, one or more of the GPUs 1108 may comprise one or more vGPUs, one or more of the CPUs 1106 may comprise one or more vCPUs, and/or one or more of the logic units 1120 may comprise one or more virtual logic units. As such, a computing device(s) 1100 may include discrete components (e.g., a full GPU dedicated to the computing device 1100), virtual components (e.g., a portion of a GPU dedicated to the computing device 1100), or a combination thereof.

Although the various blocks of FIG. 11 are shown as connected via the interconnect system 1102 with lines, this is not intended to be limiting and is for clarity only. For example, in some embodiments, a presentation component 1118, such as a display device, may be considered an I/O component 1114 (e.g., if the display is a touch screen). As another example, the CPUs 1106 and/or GPUs 1108 may include memory (e.g., the memory 1104 may be representative of a storage device in addition to the memory of the GPUs 1108, the CPUs 1106, and/or other components). In other words, the computing device of FIG. 11 is merely illustrative. Distinction is not made between such categories as “workstation,” “server,” “laptop,” “desktop,” “tablet,” “client device,” “mobile device,” “hand-held device,” “game console,” “electronic control unit (ECU),” “virtual reality system,” and/or other device or system types, as all are contemplated within the scope of the computing device of FIG. 11.

The interconnect system 1102 may represent one or more links or busses, such as an address bus, a data bus, a control bus, or a combination thereof. The interconnect system 1102 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1106 may be directly connected to the memory 1104. Further, the CPU 1106 may be directly connected to the GPU 1108. Where there is direct, or point-to-point connection between components, the interconnect system 1102 may include a PCIe link to carry out the connection. In these examples, a PCI bus need not be included in the computing device 1100.

The memory 1104 may include any of a variety of computer-readable media. The computer-readable media may be any available media that may be accessed by the computing device 1100. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1104 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1100. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1106 may be configured to execute at least some of the computer-readable instructions to control one or more components of the computing device 1100 to perform one or more of the methods and/or processes described herein. The CPU(s) 1106 may each include one or more cores (e.g., one, two, four, eight, twenty-eight, seventy-two, etc.) that are capable of handling a multitude of software threads simultaneously. The CPU(s) 1106 may include any type of processor, and may include different types of processors depending on the type of computing device 1100 implemented (e.g., processors with fewer cores for mobile devices and processors with more cores for servers). For example, depending on the type of computing device 1100, the processor may be an Advanced RISC Machines (ARM) processor implemented using Reduced Instruction Set Computing (RISC) or an x86 processor implemented using Complex Instruction Set Computing (CISC). The computing device 1100 may include one or more CPUs 1106 in addition to one or more microprocessors or supplementary co-processors, such as math co-processors.

In addition to or alternatively from the CPU(s) 1106, the GPU(s) 1108 may be configured to execute at least some of the computer-readable instructions to control one or more components of the computing device 1100 to perform one or more of the methods and/or processes described herein. One or more of the GPU(s) 1108 may be an integrated GPU (e.g., with one or more of the CPU(s) 1106 and/or one or more of the GPU(s) 1108 may be a discrete GPU. In embodiments, one or more of the GPU(s) 1108 may be a coprocessor of one or more of the CPU(s) 1106. The GPU(s) 1108 may be used by the computing device 1100 to render graphics (e.g., 3D graphics) or perform general purpose computations. For example, the GPU(s) 1108 may be used for General-Purpose computing on GPUs (GPGPU). The GPU(s) 1108 may include hundreds or thousands of cores that are capable of handling hundreds or thousands of software threads simultaneously. The GPU(s) 1108 may generate pixel data for output images in response to rendering commands (e.g., rendering commands from the CPU(s) 1106 received via a host interface). The GPU(s) 1108 may include graphics memory, such as display memory, for storing pixel data or any other suitable data, such as GPGPU data. The display memory may be included as part of the memory 1104. The GPU(s) 1108 may include two or more GPUs operating in parallel (e.g., via a link). The link may directly connect the GPUs (e.g., using NVLINK) or may connect the GPUs through a switch (e.g., using NVSwitch). When combined together, each GPU 1108 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1106 and/or the GPU(s) 1108, the logic unit(s) 1120 may be configured to execute at least some of the computer-readable instructions to control one or more components of the computing device 1100 to perform one or more of the methods and/or processes described herein. In embodiments, the CPU(s) 1106, the GPU(s) 1108, and/or the logic unit(s) 1120 may discretely or jointly perform any combination of the methods, processes and/or portions thereof. One or more of the logic units 1120 may be part of and/or integrated in one or more of the CPU(s) 1106 and/or the GPU(s) 1108 and/or one or more of the logic units 1120 may be discrete components or otherwise external to the CPU(s) 1106 and/or the GPU(s) 1108. In embodiments, one or more of the logic units 1120 may be a coprocessor of one or more of the CPU(s) 1106 and/or one or more of the GPU(s) 1108.

Examples of the logic unit(s) 1120 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1110 may include one or more receivers, transmitters, and/or transceivers that enable the computing device 1100 to communicate with other computing devices via an electronic communication network, included wired and/or wireless communications. The communication interface 1110 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1120 and/or communication interface 1110 may include one or more data processing units (DPUs) to transmit data received over a network and/or through interconnect system 1102 directly to (e.g., a memory of) one or more GPU(s) 1108.

The I/O ports 1112 may enable the computing device 1100 to be logically coupled to other devices including the I/O components 1114, the presentation component(s) 1118, and/or other components, some of which may be built in to (e.g., integrated in) the computing device 1100. Illustrative I/O components 1114 include a microphone, mouse, keyboard, joystick, game pad, game controller, satellite dish, scanner, printer, wireless device, etc. The I/O components 1114 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be include depth cameras, such as stereoscopic camera systems, infrared camera systems, RGB camera systems, touchscreen technology, and combinations of these, for gesture detection and recognition. Additionally, the computing device 1100 may include accelerometers or gyroscopes (e.g., as part of an inertia measurement unit (IMU)) that enable detection of motion. In some examples, the output of the accelerometers or gyroscopes may be used by the computing device 1100 to render immersive augmented reality or virtual reality.

The power supply 1116 may include a hard-wired power supply, a battery power supply, or a combination thereof. The power supply 1116 may provide power to the computing device 1100 to enable the components of the computing device 1100 to operate.

The presentation component(s) 1118 may include a display (e.g., a monitor, a touch screen, a television screen, a heads-up-display (HUD), other display types, or a combination thereof), speakers, and/or other presentation components. The presentation component(s) 1118 may receive data from other components (e.g., the GPU(s) 1108, the CPU(s) 1106, DPUs, etc.), and output the data (e.g., as an image, video, sound, etc.).

Example Data Center

Figure 12:
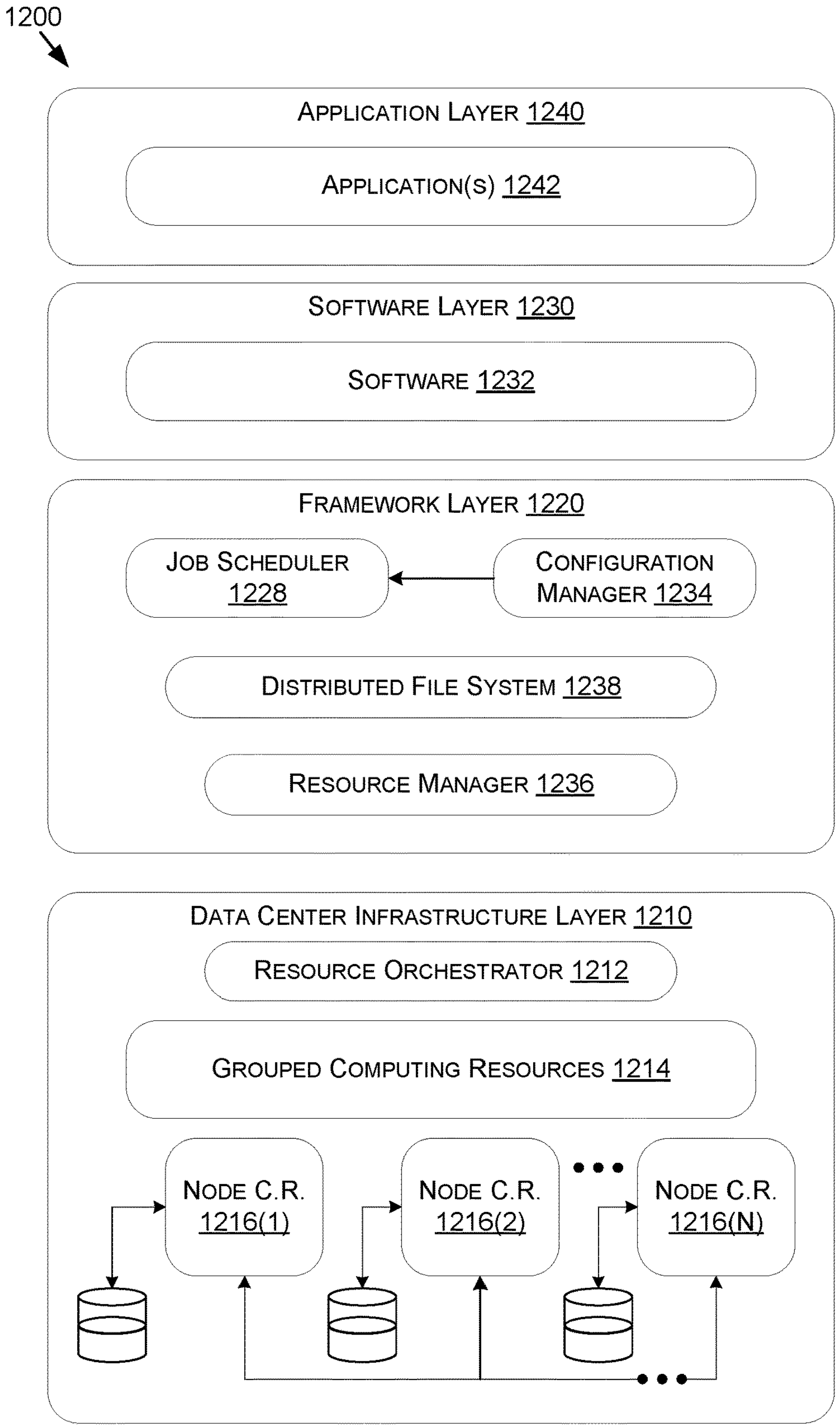
FIG. 12 is a block diagram of an example data center suitable for use in implementing some embodiments of the present disclosure.

FIG. 12 illustrates an example data center 1200 that may be used in at least one embodiments of the present disclosure. The data center 1200 may include a data center infrastructure layer 1210, a framework layer 1220, a software layer 1230, and/or an application layer 1240.

As shown in FIG. 12, the data center infrastructure layer 1210 may include a resource orchestrator 1212, grouped computing resources 1214, and node computing resources ("node C.R.s") 1216(1)-1216(N), where "N" represents any whole, positive integer. In at least one embodiment, node C.R.s 1216(1)-1216(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1216(1)-1216(N) may correspond to a server having one or more of the above-mentioned computing resources. In addition, in some embodiments, the node C.R.s 1216(1)-12161(N) may include one or more virtual components, such as vGPUs, vCPUs, and/or the like, and/or one or more of the node C.R.s 1216(1)-1216(N) may correspond to a virtual machine (VM).

In at least one embodiment, grouped computing resources 1214 may include separate groupings of node C.R.s 1216 housed within one or more racks (not shown), or many racks housed in data centers at various geographical locations (also not shown). Separate groupings of node C.R.s 1216 within grouped computing resources 1214 may include grouped compute, network, memory or storage resources that may be configured or allocated to support one or more workloads. In at least one embodiment, several node C.R.s 1216 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1212 may configure or otherwise control one or more node C.R.s 1216(1)-1216(N) and/or grouped computing resources 1214. In at least one embodiment, resource orchestrator 1212 may include a software design infrastructure (SDI) management entity for the data center 1200. The resource orchestrator 1212 may include hardware, software, or some combination thereof.

In at least one embodiment, as shown in FIG. 12, framework layer 1220 may include a job scheduler 1228, a configuration manager 1234, a resource manager 1236, and/or a distributed file system 1238. The framework layer 1220 may include a framework to support software 1232 of software layer 1230 and/or one or more application(s) 1242 of application layer 1240. The software 1232 or application(s) 1242 may respectively include web-based service software or applications, such as those provided by Amazon Web Services, Google Cloud and Microsoft Azure. The framework layer 1220 may be, but is not limited to, a type of free and open-source software web application framework such as Apache Spark™ (hereinafter "Spark") that may utilize distributed file system 1238 for large-scale data processing (e.g., "big data"). In at least one embodiment, job scheduler 1228 may include a Spark driver to facilitate scheduling of workloads supported by various layers of data center 1200. The configuration manager 1234 may be capable of configuring different layers such as software layer 1230 and framework layer 1220 including Spark and distributed file system 1238 for supporting large-scale data processing. The resource manager 1236 may be capable of managing clustered or grouped computing resources mapped to or allocated for support of distributed file system 1238 and job scheduler 1228. In at least one embodiment, clustered or grouped computing resources may include grouped computing resource 1214 at data center infrastructure layer 1210. The resource manager 1236 may coordinate with resource orchestrator 1212 to manage these mapped or allocated computing resources.

In at least one embodiment, software 1232 included in software layer 1230 may include software used by at least portions of node C.R.s 1216(1)-1216(N), grouped computing resources 1214, and/or distributed file system 1238 of framework layer 1220. One or more types of software may include, but are not limited to, Internet web page search software, e-mail virus scan software, database software, and streaming video content software.

In at least one embodiment, application(s) 1242 included in application layer 1240 may include one or more types of applications used by at least portions of node C.R.s 1216(1)-1216(N), grouped computing resources 1214, and/or distributed file system 1238 of framework layer 1220. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1234, resource manager 1236, and resource orchestrator 1212 may implement any number and type of self-modifying actions based on any amount and type of data acquired in any technically feasible fashion. Self-modifying actions may relieve a data center operator of data center 1200 from making possibly bad configuration decisions and possibly avoiding underutilized and/or poor performing portions of a data center.

The data center 1200 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1200. In at least one embodiment, trained or deployed machine learning models corresponding to one or more neural networks may be used to infer or predict information using resources described above with respect to the data center 1200 by using weight parameters calculated through one or more training techniques, such as but not limited to those described herein.

In at least one embodiment, the data center 1200 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1100 of FIG. 11—e.g., each device may include similar components, features, and/or functionality of the computing device(s) 1100. In addition, where backend devices (e.g., servers, NAS, etc.) are implemented, the backend devices may be included as part of a data center 1200, an example of which is described in more detail herein with respect to FIG. 12.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1100 described herein with respect to FIG. 11. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Example Clauses

A: A method comprising: determining, using one or more machine learning models and based at least on first audio data representative of first speech, one or more first emotional states that represents the first speech, wherein the one or more machine learning models are trained, at least, by: determining, using the one or more machine learning models and based at least on second audio data representative of second speech, one or more probabilities associated with one or more second emotional states representing the second speech; determining one or more losses based at least on the one or more probabilities and an indication of whether the one or more second emotional states better represents the second speech as compared to one or more third emotional states; and updating one or more parameters of the one or more machine learning models based at least on the one or more losses.

B: The method of paragraph A, wherein the one or more machine learning models are further trained, at least, by: determining, using the one or more machine learning models and based at least on the second audio data, one or more second probabilities associated with the one or more third emotional states representing the second speech, wherein the determining the one or more losses is further based at least on the one or more second probabilities.

C: The method of paragraph A or paragraph B, wherein the one or more machine learning models are further trained, at least, by: generating, based at least on the second audio data and the one or more second emotional states, first video data representative of a first video depicting a first animation associated with the one or more second emotional states; generating, based at least on the second audio data and the one or more third emotional states, second video data representative of a second video depicting a second animation associated with the one or more third emotional states; receiving input data representative of a selection that the first video better represents the second speech as compared to the second video; and generating the indication based at least on the selection.

D: The method of any one of paragraphs A-C, wherein the one or more machine learning models are further trained, at least, by: determining, using one or more second machine learning models and based at least on the second audio data, one or more second probabilities associated with the one or more second emotional states representing the second speech, wherein the determining the one or more losses is further based at least on the one or more second probabilities.

E: The method of paragraph D, wherein the one or more machine learning models are further trained, at least, by: determining, using the one or more machine learning models and based at least on the second audio data, one or more third probabilities associated with the one or more third emotional states representing the second speech; and determining, using the one or more second machine learning models and based at least on the second audio data, one or more fourth probabilities associated with the one or more third emotional states representing the second speech, wherein the determining the one or more losses is further based at least on the one or more third probabilities and the one or more fourth probabilities.

F: The method of any one of claims A-E, wherein: the determining the one or more losses comprises: determining, based at least on the one or more probabilities and the indication of whether the one or more second emotional states better represents the second speech as compared to the one or more third emotional states, a first loss associated with a first of the one or more second emotional states and a second loss associated with a second of the one or more second emotional states; and determining a total loss based at least on the first loss and the second loss; and the updating the one or more parameters of the one or more machine learning models is based at least on the total loss.

G: The method of any one of paragraphs A-F, wherein the one or more machine learning models are further trained, at least, by: determining, using the one or more machine learning models and based at least on third audio data representative of third speech, a first distribution of values associated with fourth emotional states; determining one or more second losses based at least on the first distribution of values and a second distribution of values associated with the fourth emotional states, the second distribution of values being associated with ground truth data; and updating, based at least on the one or more second losses, one or more initial parameters of the one or more machine learning models to include the one or more parameters.

H: The method of paragraph G, wherein the second distribution of values includes at least a first value associated with a fifth emotional state of the fourth emotional states and a second value associated with one or more sixth emotional states of the fourth emotional states, the first value being greater than the second value based at least on the ground truth data indicating that the fifth emotional state represents the third speech.

I: A system comprising: one or more processors to: determine, using one or more machine learning models and based at least on audio data representative of speech, a first distribution of values associated with emotional states; determine one or more losses based at least on the first distribution of values and a second distribution of values associated with the emotional states, the second distribution of values being associated with ground truth data; and updating, based at least on the one or more losses, one or more parameters of the one or more machine learning models.

J: The system of paragraph I, wherein the one or more processors are further to: obtain the ground truth data indicating that a first emotional state of the emotional states represents the speech; and generate, based at least on the ground truth data, the second distribution of values to include at least a first value associated with the first emotional state and a second value associated with one or more second emotional states of the emotional states, the first value being greater than the second value.

K: The system of paragraph I or paragraph J, wherein the determination of the first distribution of values associated with the emotional states comprises: generating, using the one or more machine learning models and based at least on the audio data representative of the speech, a vector associated with the one or more parameters; and determining, based at least on the vector, the first distribution of values associated with emotional states.

L: The system of paragraph K, wherein: the vector is associated with a first number of dimensions; and the emotional states include a second number of the emotional states that equals the first number of the dimensions.

M: The system of any one of paragraphs I-L, wherein the determination of the one or more losses comprises determining one or more Dirichlet log-likelihood losses based at least on the first distribution of values and the second distribution of values.

N: The system of any one of paragraphs I-M, wherein the one or more processors are further to: determine, using the one or more machine learning models and based at least on second audio data representative of second speech, one or more probabilities associated with one or more second emotional states representing the second speech; determining one or more second losses based at least on the one or more probabilities and an indication of whether the one or more second emotional states better represents the second speech as compared to one or more third emotional states; and further updating the one or more parameters of the one or more machine learning models based at least on the one or more second losses.

O: The system of paragraph N, wherein the one or more processors are further to: determine, using the one or more machine learning models and based at least on the second audio data, one or more second probabilities associated with the one or more third emotional states representing the second speech, wherein the determination of the one or more second losses is further based at least on the one or more second probabilities.

P: The system of paragraph N, wherein the one or more processors are further to: determine, using one or more second machine learning models and based at least on the second audio data, one or more second probabilities associated with the one or more second emotional states representing the second speech, wherein the determination of the one or more losses is further based at least on the one or more second probabilities.

Q: The system of any one of paragraph I-P, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using one or more large language models (LLMs); a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

R: One or more processors comprising: processing circuitry to determine, using one or more machine learning models and based at least on first audio data representative of first speech, a first sequence of emotional states associated with the first speech, wherein the one or more machine learning models are trained using one or more probabilities associated with a second sequence of emotional states and an indication that the second sequence of emotional states better represents second speech as compared to a third sequence of emotional states, the one or more probabilities being determined using the one or more machine learning models processing second audio data representative of the second speech.

S: The one or more processors of paragraph R, wherein the processing circuitry is further trained using a first distribution of values associated with emotional states as determined by the one or more machine learning models and a second distribution of values associated with ground truth data.

T: The one or more processors of paragraph R or paragraph S, wherein the one or more processors is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using one or more large language models (LLMs); a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

What is claimed is:

1. A method comprising:

determining, using one or more machine learning models and based at least on first audio data representative of first speech, one or more emotional states that represents the first speech, wherein the one or more machine learning models are trained, at least, by:

obtaining training data that includes at least first emotions data representing a first sequence of emotional states for second speech, second emotions data representing a second sequence of emotional states for the second speech, and an indication, for the second speech, of which of the first sequence of emotional states or the second sequence of emotional states better represents the second speech;

applying, to the one or more machine learning models, second audio data representative of the second speech, the first emotions data, and the second emotions data;

determining, using the one or more machine learning models and based at least on the second audio data, the first emotions data, and the second emotions data, one or more first probabilities associated with the first sequence of emotional states representing the second speech and one or more second probabilities associated with the second sequence of emotional states representing the second speech;

determining one or more losses based at least on the one or more first probabilities, the one or more second probabilities, and the indication of which of the first sequence of emotional states or the second sequence of emotional states better represents the second speech; and updating one or more parameters of the one or more machine learning models based at least on the one or more losses.

2. The method of claim 1, wherein the one or more machine learning models are further trained, at least, by:

determining that the one or more second probabilities are less than the one or more first probabilities, wherein the determining the one or more losses is based at least on the determining the one or more second probabilities are less than the one or more first probabilities and the indication.

3. The method of claim 1, wherein the one or more machine learning models are further trained, at least, by:

generating, based at least on the second audio data and the first sequence of emotional states, first video data representative of a first video depicting a first animation associated with the first sequence of emotional states;

generating, based at least on the second audio data and the second sequence of emotional states, second video data representative of a second video depicting a second animation associated with the second sequence of emotional states;

receiving input data representative of a selection that the first video better represents the second speech as compared to the second video; and generating the indication based at least on the selection.

4. The method of claim 1, wherein the one or more machine learning models are further trained, at least, by:

determining, using one or more second machine learning models and based at least on the second audio data, one or more third probabilities associated with the first sequence of emotional states representing the second speech, wherein the determining the one or more losses is further based at least on the one or more third probabilities.

5. The method of claim 4, wherein the one or more machine learning models are further trained, at least, by:

determining, using the one or more second machine learning models and based at least on the second audio data, one or more fourth probabilities associated with the second sequence of emotional states representing the second speech, wherein the determining the one or more losses is further based at least on the one or more fourth probabilities.

6. The method of claim 1, wherein the one or more machine learning models are further trained, at least, by:

determining, using the one or more machine learning models and based at least on third audio data representative of third speech, a first distribution of values associated with second emotional states;

determining one or more second losses based at least on the first distribution of values and a second distribution of values associated with the second emotional states; and updating, based at least on the one or more second losses, one or more initial parameters of the one or more machine learning models to include the one or more parameters.

7. The method of claim 6, wherein the second distribution of values includes at least a first value associated with a first emotional state of the second emotional states and a second value associated with a second emotional state of the second emotional states, the first value being greater than the second value based at least on ground truth data indicating that the first emotional state represents the third speech.

8. The method of claim 1, wherein:

the first sequence of emotional states includes at least a first emotional state associated with a first portion of the second speech and a second emotional state associated with a second portion of the second speech; and the second sequence of emotional states includes at least a third emotional state associated with the first portion of the second speech and a fourth emotional state associated with the second portion of the second speech.

9. A system comprising:

one or more processors to:

determine, using one or more machine learning models and based at least on audio data representative of speech, a first distribution of values associated with emotional states;

determine one or more losses based at least on the first distribution of values and a second distribution of values associated with the emotional states for the speech, the second distribution of values comprising a target distribution derived from ground truth data, the ground truth data indicating a preference for a first sequence of emotional states over a second sequence of emotional states as representing the speech; and updating, based at least on the one or more losses, one or more parameters of the one or more machine learning models.

10. The system of claim 9, wherein the one or more processors are further to:

obtain the ground truth data indicating that the preference for the first sequence of emotional states over the second sequence of emotional states as representing the speech; and generate, based at least on the ground truth data, the second distribution of values to include at least a first value associated with a first emotional state and a second value associated with one or more second emotional states of the emotional states, the first value including a maximum value based at least on the first emotional state representing the speech.

11. The system of claim 9, wherein the determination of the first distribution of values associated with the emotional states comprises:

generating, using the one or more machine learning models and based at least on the audio data representative of the speech, a vector associated with the one or more parameters; and determining, based at least on the vector, the first distribution of values associated with emotional states.

12. The system of claim 11, wherein:

the vector is associated with a number of dimensions; and the emotional states include a second number of the emotional states that equals the number of dimensions.

13. The system of claim 9, wherein the determination of the one or more losses comprises determining one or more Dirichlet log-likelihood losses based at least on the first distribution of values and the second distribution of values.

14. The system of claim 9, wherein the one or more processors are further to:

determine, using the one or more machine learning models and based at least on second audio data representative of second speech, one or more probabilities associated with one or more second emotional states representing the second speech;

determining one or more second losses based at least on the one or more probabilities and an indication of whether the one or more second emotional states better represents the second speech as compared to one or more third emotional states; and further updating the one or more parameters of the one or more machine learning models based at least on the one or more second losses.

15. The system of claim 14, wherein the one or more processors are further to:

determine, using the one or more machine learning models and based at least on the second audio data, one or more second probabilities associated with the one or more third emotional states representing the second speech, wherein the one or more second losses are further determined based at least on the one or more second probabilities.

16. The system of claim 14, wherein the one or more processors are further to:

determine, using one or more second machine learning models and based at least on the second audio data, one or more second probabilities associated with the one or more second emotional states representing the second speech, wherein the one or more second losses are further determined based at least on the one or more second probabilities.

17. The system of claim 9, wherein the system is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more generative AI operations;

a system for performing operations using one or more large language models (LLMs);

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

18. One or more processors comprising:

processing circuitry to:

obtain training data that includes at least first emotions data representing a first sequence of emotional states for speech, second emotions data representing a second sequence of emotional states for the speech, and ground truth data representing an indication whether the first sequence of emotional states better represents the speech as compared to the second sequence of emotional states apply, to one or more machine learning models, audio data representative of the speech, the first emotions data, and the second emotions data;

determine, using the one or more machine learning models and based at least on the audio data, the first emotions data, and the second emotions data, one or more first probabilities associated with the first sequence of emotional states representing the speech and one or more second probabilities associated with the second sequence of emotional states representing the speech;

determine one or more losses based at least on the one or more first probabilities, the one or more second probabilities, and the indication of whether the first sequence of emotional states better represents the speech as compared to second sequence of emotional states; and update one or more parameters of the one or more machine learning models based at least on the one or more losses.

19. The one or more processors of claim 18, wherein the one or more processors is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more generative AI operations;

a system for performing operations using one or more large language models (LLMs);

a system for performing one or more conversational AI operations;

a system for generating synthetic data;

a system for presenting at least one of virtual reality content, augmented reality content, or mixed reality content;

a system incorporating one or more virtual machines (VMs);

a system implemented at least partially in a data center; or a system implemented at least partially using cloud computing resources.

20. The one or more processors of claim 18, wherein the processing circuitry is further to:

determine that the one or more second probabilities are less than the one or more first probabilities, wherein one or more losses are determined based at least on the one or more second probabilities being less than the one or more first probabilities and the indication.

* * * * *